(12) United States Patent
Lee

(10) Patent No.: US 11,544,602 B2
(45) Date of Patent: Jan. 3, 2023

(54) ARTIFICIAL INTELLIGENCE DEVICE

(71) Applicant: LG ELECTRONICS INC., Seoul (KR)

(72) Inventor: Sangseok Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 476 days.

(21) Appl. No.: 16/708,217

(22) Filed: Dec. 9, 2019

(65) Prior Publication Data

US 2021/0133609 A1    May 6, 2021

(30) Foreign Application Priority Data

Oct. 30, 2019   (KR) .......................... 10-2019-0136432

(51) Int. Cl.
*G06N 5/04*     (2006.01)
*G06F 16/9532*     (2019.01)
*G10L 15/22*     (2006.01)
*G10L 15/26*     (2006.01)

(52) U.S. Cl.
CPC .......... *G06N 5/043* (2013.01); *G06F 16/9532* (2019.01); *G10L 15/22* (2013.01); *G10L 15/26* (2013.01); *G10L 2015/223* (2013.01)

(58) Field of Classification Search
CPC ................. H04N 21/472; H04N 21/45; H04N 21/44222; H04N 21/42203; G10L 2015/223; G10L 15/22; G10L 15/26; G10L 15/16; G10L 15/18; G10L 15/1822; G06N 5/043; G06F 16/9532
See application file for complete search history.

(56) References Cited

U.S. PATENT DOCUMENTS

| | | | | |
|---|---|---|---|---|
| 5,498,003 A | * | 3/1996 | Gechter | A63F 13/63 463/31 |
| 5,715,416 A | * | 2/1998 | Baker | G06F 16/10 715/744 |
| 5,872,575 A | * | 2/1999 | Segal | G06T 15/00 345/473 |
| 6,065,042 A | * | 5/2000 | Reimer | G06F 16/78 348/E7.071 |
| 6,097,393 A | * | 8/2000 | Prouty, IV | G06F 3/04815 715/848 |
| 6,282,713 B1 | * | 8/2001 | Kitsukawa | H04N 21/4784 725/36 |
| 6,409,602 B1 | * | 6/2002 | Wiltshire | G07F 17/3288 463/16 |

(Continued)

OTHER PUBLICATIONS

European Patent Office Application Serial No. 19214732.0, Search Report dated Jul. 15, 2020, 8 pages.

*Primary Examiner* — Michael B. Pierorazio
(74) *Attorney, Agent, or Firm* — Lee, Hong, Degerman, Kang & Waimey PC

(57) ABSTRACT

An artificial intelligence device according to an embodiment of the present disclosure may receive voice data corresponding to viewing information and a search command from a display device, convert the received voice data into text data, obtain a first query indicating intention of the converted text data, convert the first query into a second query based on the viewing information, obtain a search result corresponding to the converted second, and transmit the obtained search result to the display device.

12 Claims, 17 Drawing Sheets

(56) References Cited

U.S. PATENT DOCUMENTS

| | | | | |
|---|---|---|---|---|
| 6,658,662 B1* | 12/2003 | Nielsen | H04N 7/16 | 348/E7.054 |
| 7,000,242 B1* | 2/2006 | Haber | G06Q 40/12 | 725/43 |
| 7,054,831 B2* | 5/2006 | Koenig | A63F 13/61 | 463/16 |
| 7,162,197 B2* | 1/2007 | Kitamura | A63H 33/38 | 715/251 |
| 7,664,678 B1* | 2/2010 | Haber | G06Q 30/0639 | 705/26.9 |
| 7,715,642 B1* | 5/2010 | Collins | H04N 19/23 | 382/284 |
| 8,043,156 B2* | 10/2011 | Ackley | H04L 67/38 | 463/31 |
| 8,079,054 B1* | 12/2011 | Dhawan | H04N 21/812 | 705/14.6 |
| 8,221,220 B2* | 7/2012 | Ackley | A63F 13/79 | 463/31 |
| 8,627,379 B2* | 1/2014 | Kokenos | G06Q 30/02 | 725/51 |
| 8,898,719 B2* | 11/2014 | Poder | H04N 21/4112 | 725/121 |
| 8,910,201 B1* | 12/2014 | Zamiska | H04N 21/458 | 725/60 |
| 9,462,340 B1* | 10/2016 | Mathurin | H04N 21/8106 | |
| 9,516,373 B1* | 12/2016 | Abecassis | H04N 21/4122 | |
| 9,596,502 B1* | 3/2017 | Abecassis | H04N 21/4398 | |
| 2001/0001160 A1* | 5/2001 | Shoff | H04N 21/4312 | 725/108 |
| 2001/0037303 A1* | 11/2001 | Mizrahi | H04N 21/816 | 348/E7.071 |
| 2001/0039571 A1* | 11/2001 | Atkinson | H04N 21/26258 | 348/E7.071 |
| 2001/0053996 A1* | 12/2001 | Atkinson | H04N 21/41265 | 348/E7.071 |
| 2002/0033844 A1* | 3/2002 | Levy | G06F 40/117 | 715/744 |
| 2002/0052746 A1* | 5/2002 | Handelman | H04N 21/4223 | 704/E15.045 |
| 2002/0069405 A1* | 6/2002 | Chapin | H04N 21/812 | 725/135 |
| 2002/0133562 A1* | 9/2002 | Newnam | G06Q 30/02 | 709/216 |
| 2002/0162117 A1* | 10/2002 | Pearson | H04N 21/8456 | 725/135 |
| 2003/0056212 A1* | 3/2003 | Siegel | H04N 5/913 | 380/278 |
| 2003/0149618 A1* | 8/2003 | Sender | G06Q 30/0277 | 705/26.1 |
| 2003/0149975 A1* | 8/2003 | Eldering | H04N 21/812 | 348/E7.071 |
| 2003/0217210 A1* | 11/2003 | Carau, Sr. | G06K 19/077 | 710/302 |
| 2004/0068536 A1* | 4/2004 | Demers | H04L 65/80 | 709/201 |
| 2004/0073493 A1* | 4/2004 | Kato | H04N 21/43074 | 348/E7.071 |
| 2004/0255322 A1* | 12/2004 | Meadows | H04N 21/2543 | 725/23 |
| 2005/0066352 A1* | 3/2005 | Herley | H04N 21/42203 | 348/E7.071 |
| 2005/0132398 A1* | 6/2005 | Baran | G06Q 30/04 | 348/E7.071 |
| 2005/0144024 A1* | 6/2005 | Wojton | G06Q 50/10 | 705/319 |
| 2005/0267813 A1* | 12/2005 | Monday | H04N 21/47 | 705/14.69 |
| 2006/0123451 A1* | 6/2006 | Preisman | H04N 7/17318 | 348/E7.071 |
| 2006/0184579 A1* | 8/2006 | Mills | H04N 21/4788 | |
| 2006/0291483 A1* | 12/2006 | Sela | H04M 1/0262 | 370/401 |
| 2008/0015864 A1* | 1/2008 | Ross | G10L 15/1822 | 704/E15.044 |
| 2008/0089659 A1* | 4/2008 | Clapper | G06F 16/40 | 386/248 |
| 2008/0115161 A1* | 5/2008 | Kurzion | G06Q 30/02 | 725/62 |
| 2008/0115655 A1* | 5/2008 | Weng | G10H 1/0008 | 84/609 |
| 2008/0187279 A1* | 8/2008 | Gilley | G06Q 30/02 | 386/250 |
| 2008/0221986 A1* | 9/2008 | Soicher | G06Q 30/0277 | 705/14.56 |
| 2008/0282283 A1* | 11/2008 | Hilton | H04N 21/47815 | 725/86 |
| 2008/0285940 A1* | 11/2008 | Kulas | H04N 21/4325 | 386/353 |
| 2008/0295129 A1* | 11/2008 | Laut | H04N 21/812 | 725/34 |
| 2009/0094632 A1* | 4/2009 | Newnam | H04N 21/4758 | 725/24 |
| 2009/0217316 A1* | 8/2009 | Gupta | G06Q 30/0269 | 705/14.66 |
| 2009/0281908 A1* | 11/2009 | Wong | H04N 21/2543 | 705/26.1 |
| 2009/0293081 A1* | 11/2009 | Pirani | H04N 21/4334 | 707/999.003 |
| 2009/0299752 A1* | 12/2009 | Rodriguez | G06F 40/242 | 704/E15.001 |
| 2010/0131385 A1* | 5/2010 | Harrang | G06Q 30/0631 | 705/26.1 |
| 2010/0256561 A1* | 10/2010 | Gillespie, Jr. | G01B 7/003 | 604/151 |
| 2010/0283741 A1* | 11/2010 | Heintze | G06F 3/0238 | 345/173 |
| 2010/0332570 A1* | 12/2010 | Roberts | H04N 21/25866 | 707/957 |
| 2011/0137753 A1* | 6/2011 | Moehrle | H04N 21/812 | 725/60 |
| 2011/0138326 A1* | 6/2011 | Roberts | G06Q 30/0243 | 715/808 |
| 2011/0167456 A1* | 7/2011 | Kokenos | G06Q 30/06 | 725/60 |
| 2011/0276334 A1* | 11/2011 | Wang | G10H 1/361 | 704/E21.001 |
| 2011/0289536 A1* | 11/2011 | Poder | H04N 21/658 | 725/95 |
| 2011/0310580 A1* | 12/2011 | Leung | G06F 3/04886 | 361/807 |
| 2012/0016678 A1* | 1/2012 | Gruber | G06F 3/167 | 704/E21.001 |
| 2012/0084811 A1* | 4/2012 | Thompson | H04N 21/44226 | 725/34 |
| 2012/0084812 A1* | 4/2012 | Thompson | H04N 21/44204 | 725/34 |
| 2012/0110620 A1* | 5/2012 | Kilar | H04N 21/812 | 725/34 |
| 2012/0204207 A1* | 8/2012 | Clapper | H04N 21/858 | 725/38 |
| 2013/0304795 A1* | 11/2013 | Kang | H04N 21/43637 | 709/202 |
| 2014/0109161 A1* | 4/2014 | Chang | H04N 21/4622 | 725/110 |
| 2014/0250477 A1* | 9/2014 | Kang | H04N 21/458 | 725/110 |
| 2014/0278834 A1* | 9/2014 | Lautz | G06Q 30/0245 | 705/12 |
| 2016/0077573 A1* | 3/2016 | Lee | H04L 12/12 | 713/310 |
| 2017/0068670 A1 | 3/2017 | Orr et al. | | |

* cited by examiner

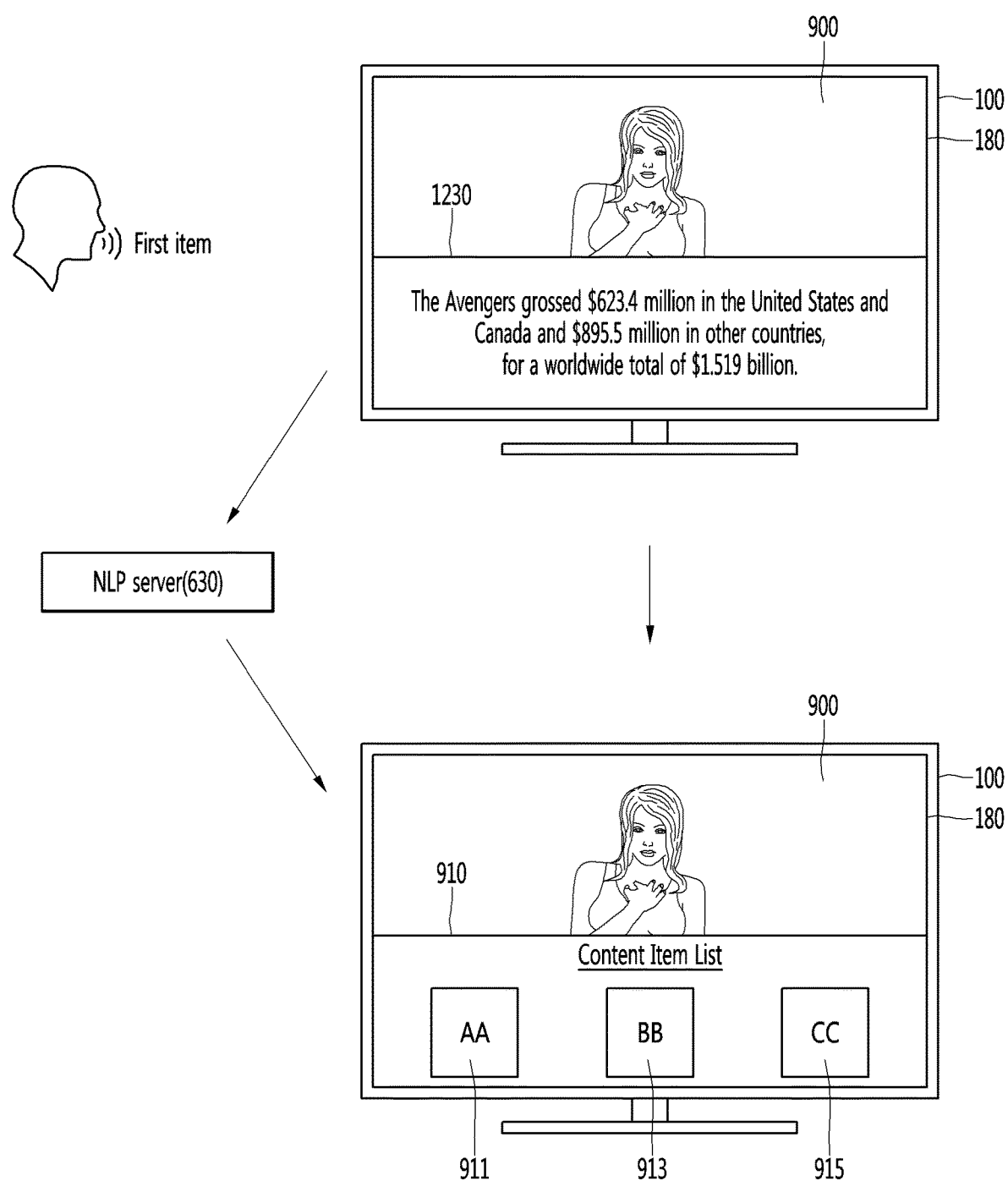

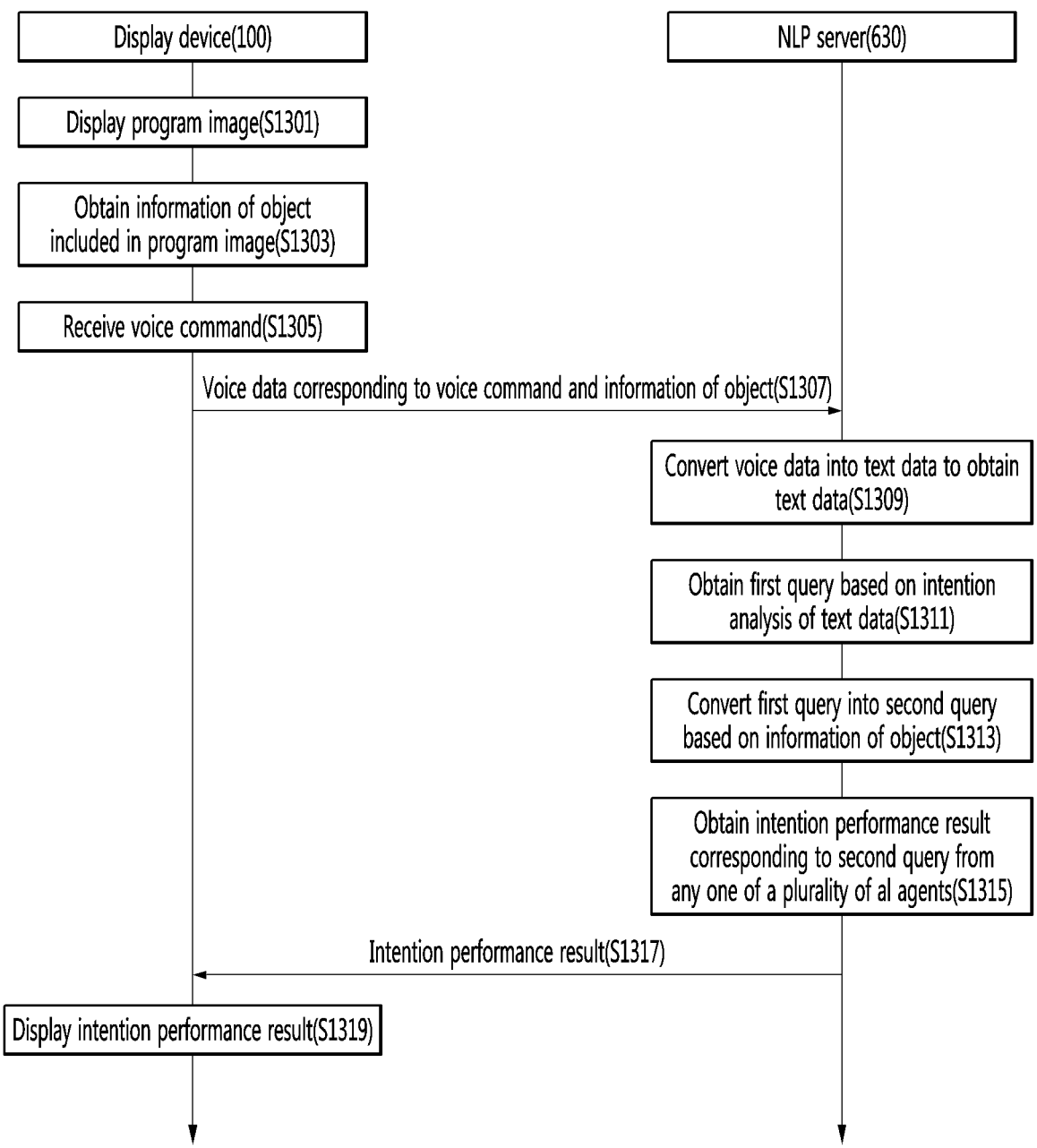

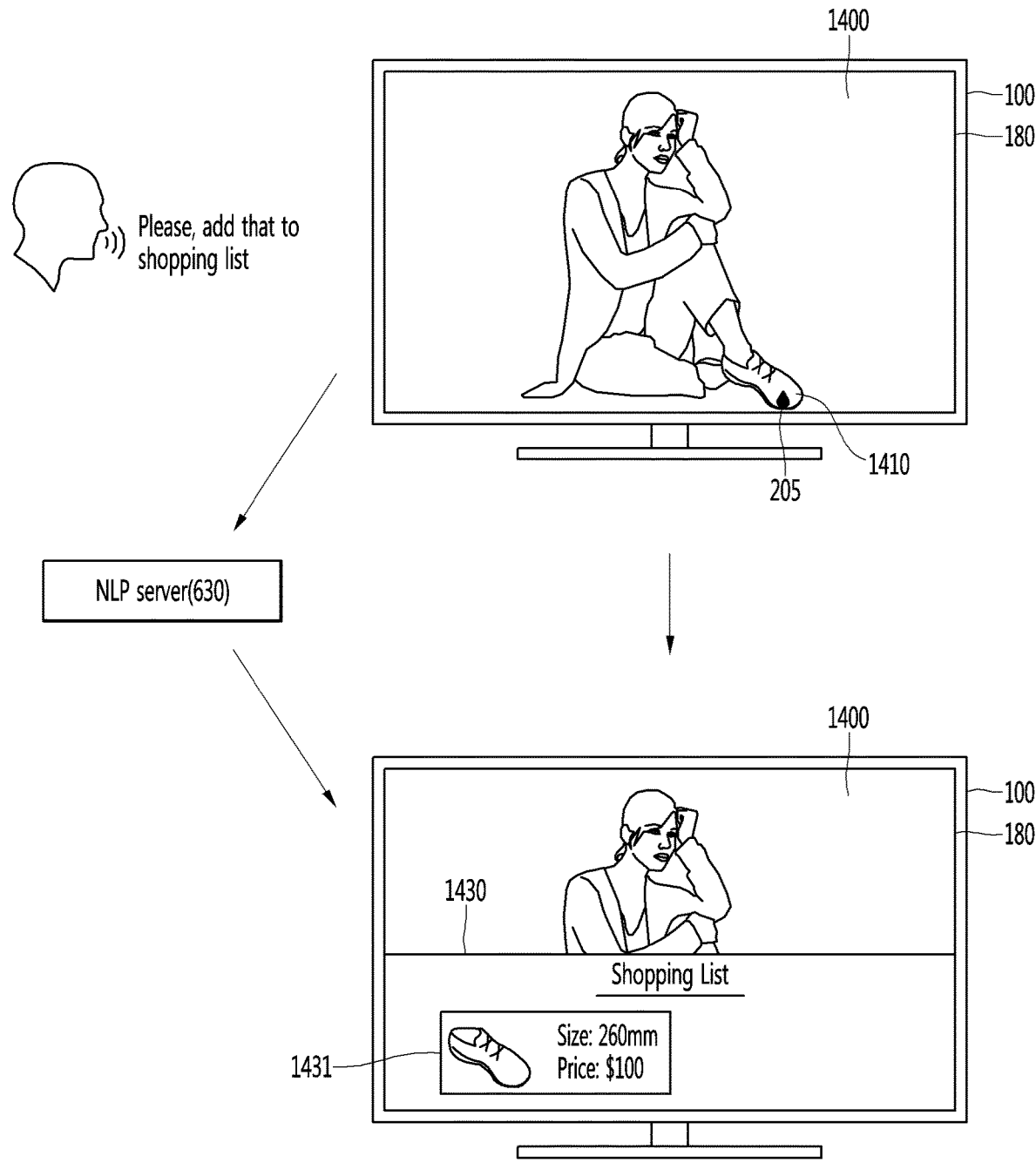

ARTIFICIAL INTELLIGENCE DEVICE

CROSS-REFERENCE TO RELATED APPLICATIONS

Pursuant to 35 U.S.C. § 119(a), this application claims the benefit of earlier filing date and right of priority to Korean Patent Application No. 10-2019-0136432, filed on Oct. 30, 2019, the contents of which are hereby incorporated by reference herein in its entirety.

BACKGROUND

The present disclosure relates to being able to provide a voice recognition service through a plurality of artificial intelligence agents.

Digital TV services using wired or wireless communication networks are becoming common. Digital TV service can provide a variety of services that could not be provided in the conventional analog broadcasting service.

For example, IPTV (Internet Protocol Television), which is a type of digital TV service, and smart TV service provide bidirectionality that allows a user to actively select a type of viewing the program and viewing time. IPTV, smart TV service may provide a variety of additional services, such as Internet search, home shopping, and online games based on this bidirectionality.

Recently, a lot of technologies for recognizing a user's utterance and providing a voice recognition service according to the user's utterance using artificial intelligence have emerged.

In general, a display device is equipped with a plurality of artificial intelligence (AI) agents capable of providing a voice recognition service.

Conventionally, a plurality of AI agents have provided information or queries related to the program information that the user is viewing.

However, associated information or queries have been provided in a limited range that is linked to a search term previously searched by a user.

For example, if the previous search term is <weather>, information related to this only is <tomorrow is> which is a continuous query that induces the user's utterance.

In other words, in the conventional multi-AI agent service, since the provision of information linked to a previous search term is limited to a limited range, there is inconvenience in searching for various and continuous information.

SUMMARY

An object of the present disclosure is to be capable of performing continuously search for a variety of information through a user's utterance.

An object of the present disclosure is to enable continuous search of information by using a search result of each AI agent if providing a voice recognition service through a multi-AI agent.

An artificial intelligence device according to an embodiment of the present disclosure may receive voice data corresponding to viewing information and a search command from a display device, convert the received voice data into text data, obtain a first query indicating intention of the converted text data, convert the first query into a second query based on the viewing information, obtain a search result corresponding to the converted second, and transmit the obtained search result to the display device.

An artificial intelligence device according to another embodiment of the present disclosure may receive voice data corresponding to information of an object and a voice command from the display device through the communication interface, convert the received voice data into text data, obtain a first query indicating the intention of the converted text data, convert the first query into a second query based on the information of an object, obtain an intention performance result corresponding to the converted second query, and transmit the obtained intention performance result to the display device.

According to various embodiments of the present disclosure, the search of various information is naturally and continuously performed, so that a user may feel an improved experience of information search.

BRIEF DESCRIPTION OF THE DRAWINGS

FIG. 12C is a view illustrating an embodiment for describing a process of canceling the selection of a content item.

FIG. 13 is a ladder diagram for describing a method of operating an artificial intelligence system, according to another embodiment of the present disclosure.

FIGS. 14 and 15 are diagrams for describing an embodiment of grasping a user's utterance intention using an object recognition technology.

DETAILED DESCRIPTION OF THE EMBODIMENTS

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present disclosure, for example, as an artificial display device that adds a computer supporting function to a broadcast receiving function, can have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

Figure 1:
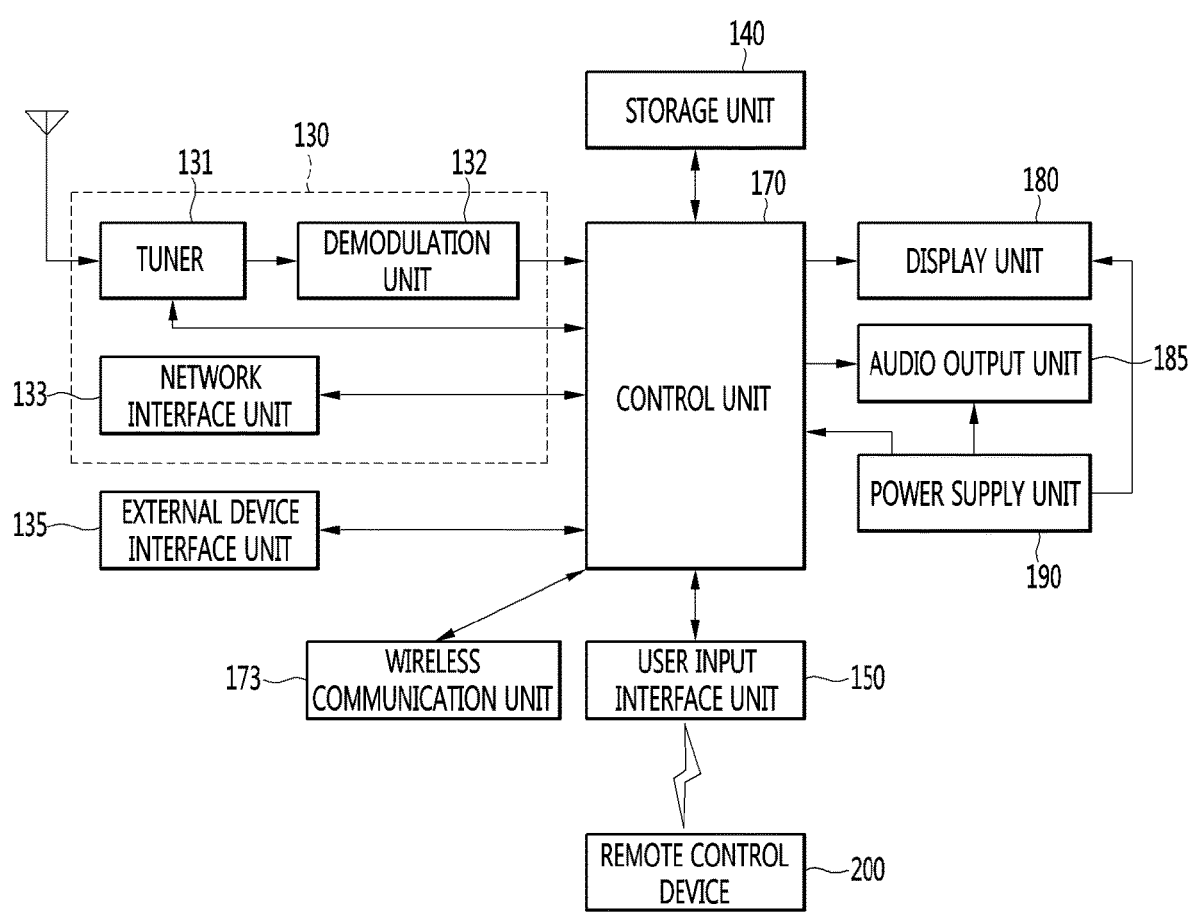
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception unit 130, an external device interface unit 135, a storage unit 140, a user interface unit 150, a control unit 170, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface unit 135 can provide a connection path between the display device 100 and an external device. The external device interface unit 135 can receive at least one an image or audio output from an external device that is wirelessly or wiredly connected to the display device 100 and deliver it to the control unit 170. The external device interface unit 135 can include a plurality of external input terminals. The plurality of external input terminals can include an RGB terminal, at least one High Definition Multimedia Interface (HDMI) terminal, and a component terminal.

An image signal of an external device input through the external device interface unit 135 can be output through the display unit 180. A voice signal of an external device input through the external device interface unit 135 can be output through the audio output unit 185.

An external device connectable to the external device interface unit 135 can be one of a set-top box, a Blu-ray player, a DVD player, a game console, a sound bar, a smartphone, a PC, a USB Memory, and a home theater system, but this is just exemplary.

The network interface unit 133 can provide an interface for connecting the display device 100 to a wired/wireless network including the Internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. In other words, the network interface unit 133 can transmit or receive data to or from a corresponding server by accessing a predetermined webpage through the network.

Then, the network interface unit 133 can receive contents or data provided from a content provider or a network operator. In other words, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an Internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily storing image, voice, or data signals output from the external device interface unit 135 or the network interface unit 133 and can store information on a predetermined image through a channel memory function.

The storage unit 140 can store an application or an application list input from the external device interface unit 135 or the network interface unit 133.

The display device 100 can play content files (for example, video files, still image files, music files, document files, application files, and so on) stored in the storage unit 140 and provide them to a user.

The user interface unit 150 can deliver signals input by a user to the control unit 170 or deliver signals from the control unit 170 to a user. For example, the user interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user interface unit 150 can deliver, to the control unit 170, control signals input from local keys (not illustrated) such as a power key, a channel key, a volume key, and a setting key.

Image signals that are image-processed in the control unit 170 can be input to the display unit 180 and displayed as an image corresponding to corresponding image signals. Additionally, image signals that are image-processed in the control unit 170 can be input to an external output device through the external device interface unit 135.

Voice signals processed in the control unit 170 can be output to the audio output unit 185. Additionally, voice signals processed in the control unit 170 can be input to an external output device through the external device interface unit 135.

Besides that, the control unit 170 can control overall operations in the display device 100. Additionally, the control unit 170 can control the display device 100 by a user command or internal program input through the user interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user interface unit 150, the control unit 170 can output image signals or voice signals of an external device such as a camera or a camcorder, which are input through the external device interface unit 135, through the display unit 180 or the audio output unit 185.

Moreover, the control unit 170 can control the display unit 180 to display images and control broadcast images input through the tuner 131, external input images input through the external device interface unit 135, images input through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content input from the outside, and the content can be in various formats such as broadcast images, external input images, audio files, still images, accessed web screens, and document files.

The wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The display unit 180 can convert image signals, data signals, or on-screen display (OSD) signals, which are processed in the control unit 170, or images signals or data signals, which are received in the external device interface unit 135, into R, G, and B signals to generate driving signals.

Meanwhile, the display device 100 illustrated in FIG. 1 is just one embodiment of the present disclosure and thus, some of the components illustrated can be integrated, added, or omitted according to the specification of the actually implemented display device 100.

In other words, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents input from the image processing device.

In this case, an operating method of a display device according to an embodiment of the present disclosure described below can be performed by one of the display device described with reference to FIG. 1, an image processing device such as the separated set-top box, and a content playback device including the display unit 180 and the audio output unit 185.

Figure 2:
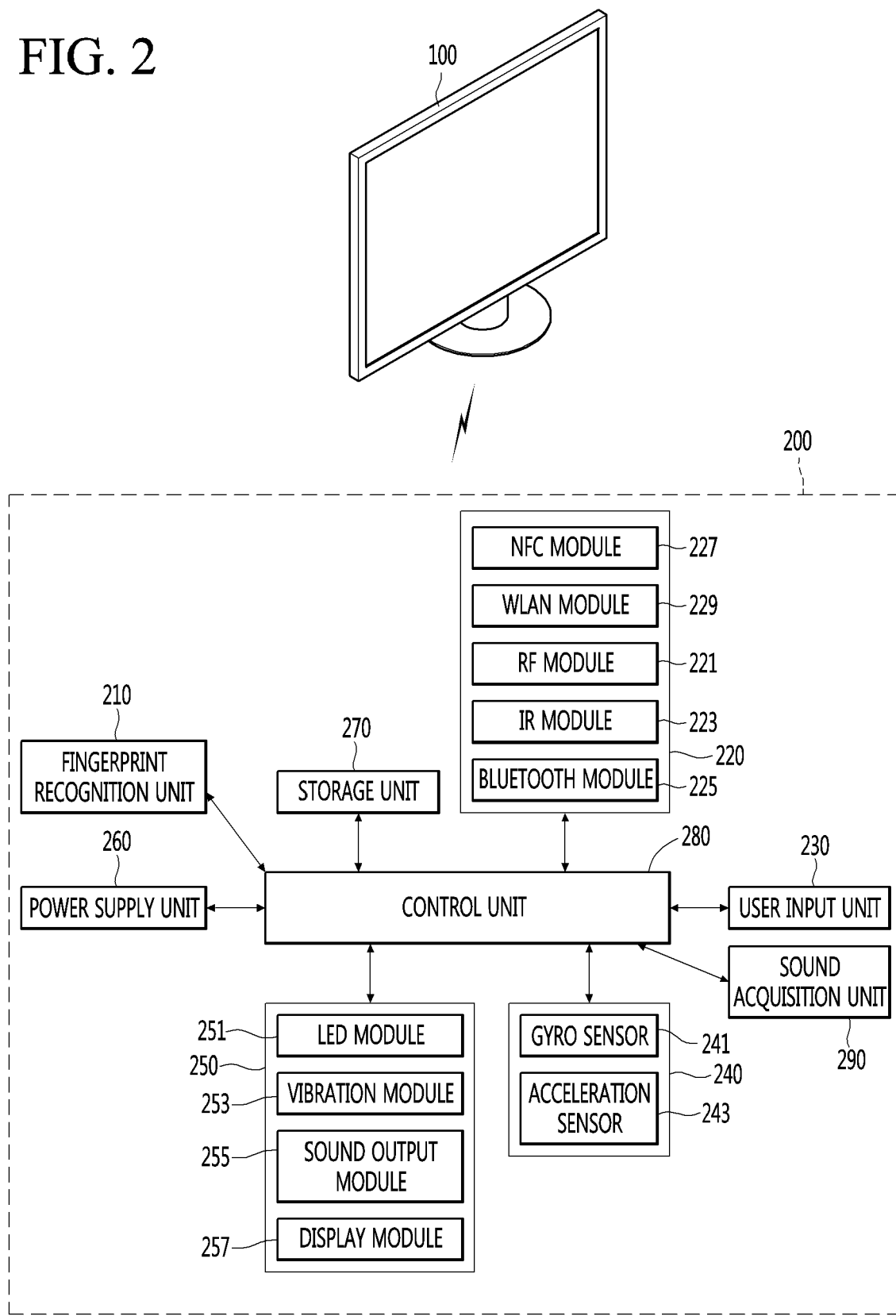
FIG. 2 is a block diagram illustrating a remote control device according to an embodiment of the present disclosure.
Figure 3:
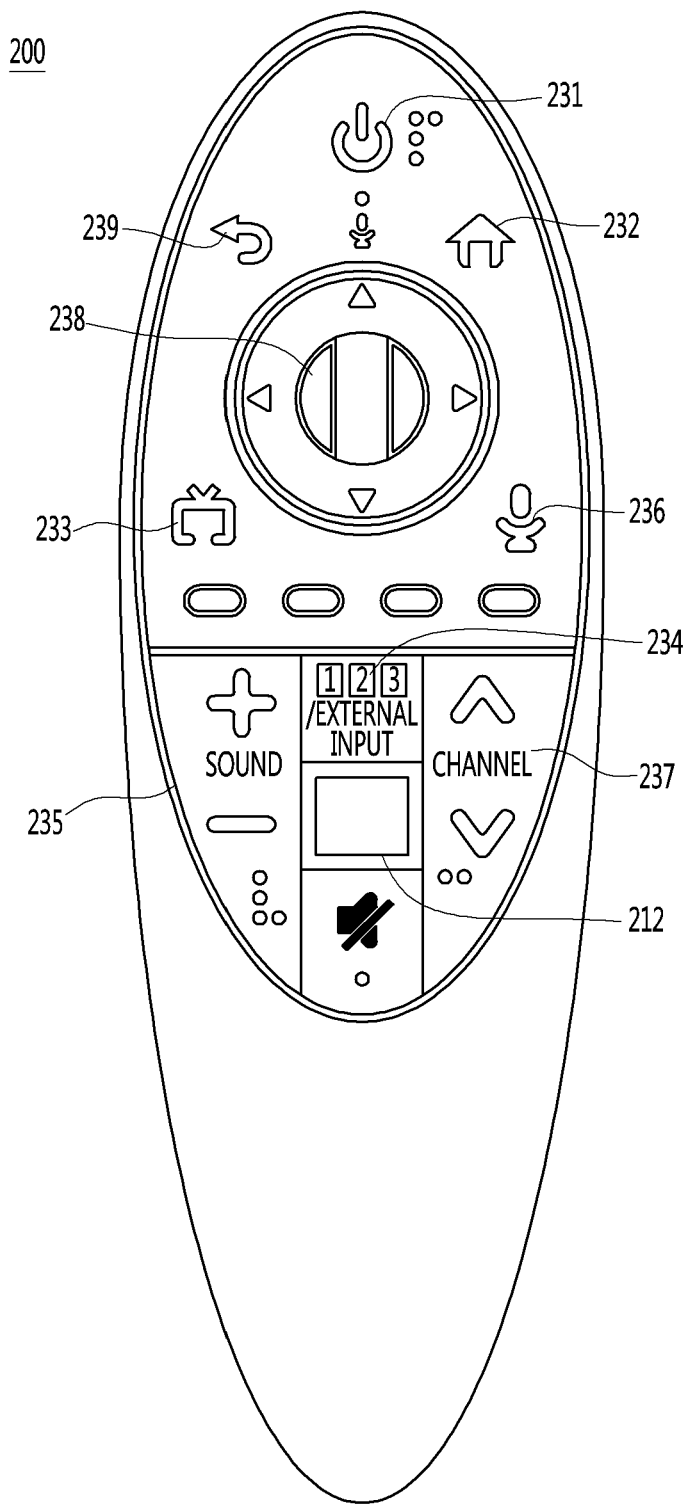
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device 200 according to an embodiment of the present disclosure.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a voice acquisition unit 290.

Referring to FIG. 2, the wireless communication unit 220 transmits/receives signals to/from an arbitrary any one of display devices according to the above-mentioned embodiments of the present disclosure.

The remote control device 200 can include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The home button 232 can be a button for moving to the home screen of the display device 100. The live button 233 can be a button for displaying live broadcast programs. The external input button 234 can be a button for receiving an external input connected to the display device 100. The voice adjustment button 235 can be a button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

FIG. 2 will be described again.

If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present disclosure.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals corresponding to manipulation of the user input unit 235 or corresponding to signals transmitted from the display device 100. A user can recognize whether the user input unit 235 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to control of the remote control device 200. The control unit 280 can transmit a signal corresponding to a predetermined key manipulation of the user input unit 235 or a signal corresponding to movement of the remote control device 200 sensed by the sensor unit 240 to the display device 100 through the wireless communication unit 225.

Additionally, the voice acquisition unit 290 of the remote control device 200 can obtain voice.

The voice acquisition unit 290 can include at least one microphone 291 and obtain voice through the microphone 291.

Figure 4:
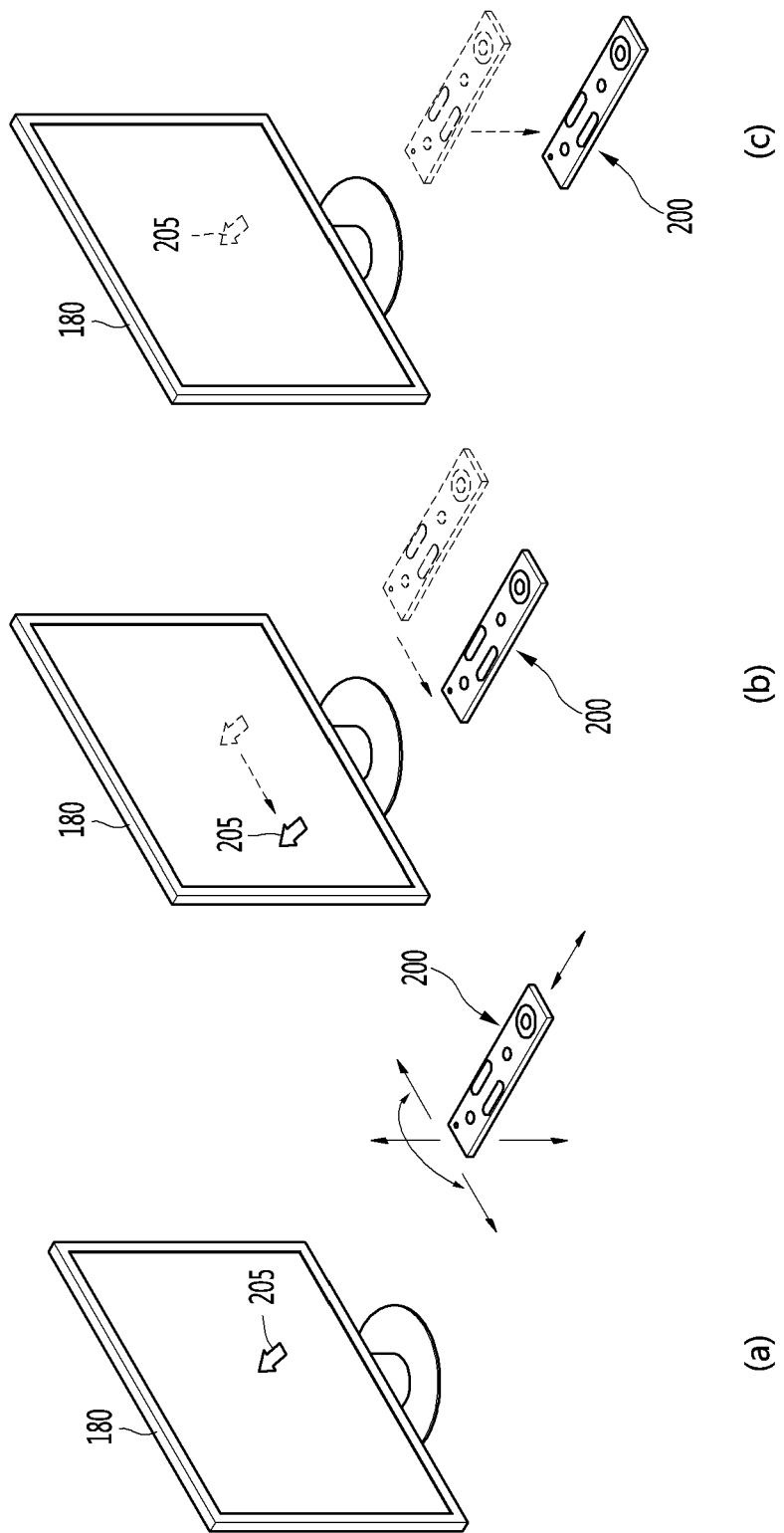
FIG. 4 is a view of utilizing a remote control device according to an embodiment of the present disclosure.

Next, FIG. 4 is illustrated.

FIG. 4 is a view of utilizing a remote control device according to an embodiment of the present disclosure.

FIG. 4(*a*) illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote control device.

FIG. 4(*b*) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(*c*) illustrates that while a specific button in the remote control device 200 is pressed, a user moves the remote control device 200 away from the display unit 180. Thus, a selection area in the display unit 180 corresponding to the pointer 205 can be zoomed in and displayed larger.

On the contrary, if the user moves the remote control device 200 to approach the display unit 180, the selection area in the display unit 180 corresponding to the pointer 205 may be zoomed out and reduced.

On the other hand, if the remote control device 200 is moved away from the display unit 180, a selection area can be zoomed out and if the remote control device 200 is moved closer to the display unit 180, a selection area can be zoomed in.

Additionally, if a specific button in the remote control device 200 is pressed, recognition of a vertical or horizontal movement can be excluded. In other words, if the remote control device 200 is moved away from or closer to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Figure 5:
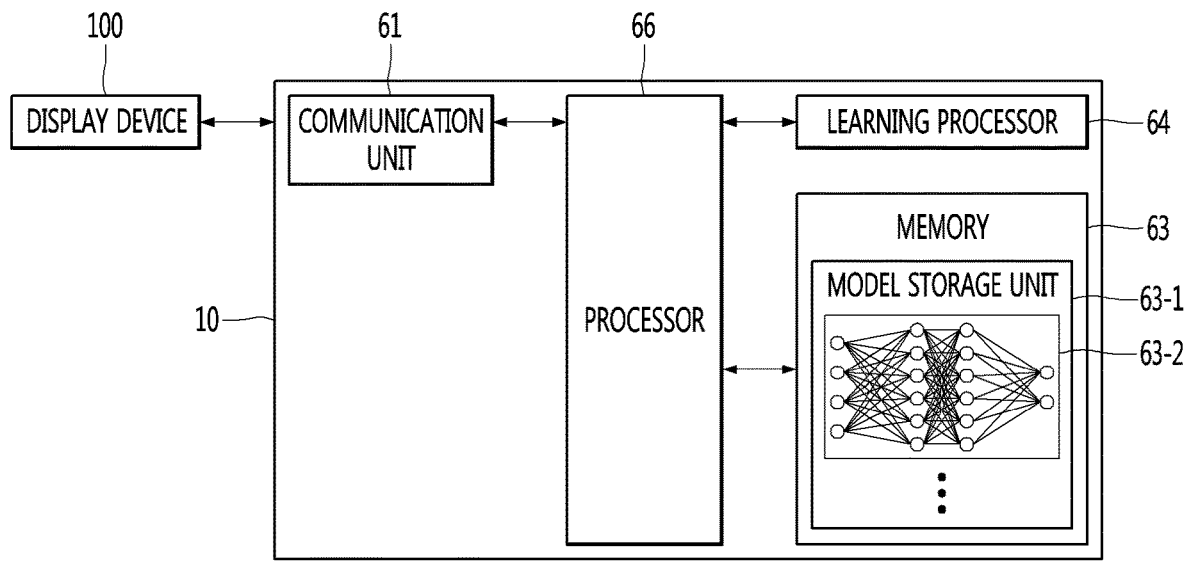
FIG. 5 is a block diagram illustrating a configuration of an AI server according to an embodiment of the present disclosure.

FIG. 5 is a block diagram illustrating a configuration of an AI server according to an embodiment of the present disclosure.

Referring to FIG. 5, the Artificial Intelligence (AI) server 10 may refer to a device for learning artificial neural network using a machine learning algorithm or using learned artificial neural network.

Here, the AI server 10 may be composed of a plurality of servers to perform distributed processing or may be defined as a 5G network. In this case, the AI server 10 may be included as a portion of the display device 100 to perform at least some of the AI processing together.

The AI server 10 may include a communication unit 61, a memory 63, a learning processor 64, a processor 66, and the like.

The communication unit 61 may transmit/receive data with an external device such as the display device 100.

The memory 63 may include a model storage unit 63-1. The model storage unit 63-1 may store the training or trained model (or artificial neural network 63-2) through the learning processor 64.

The learning processor 64 may train the artificial neural network 63-2 using the training data. The training model may be used in a state of being mounted in the AI server 10 of the artificial neural network or may be mounted and used in an external device such as the display device 100.

The training model can be implemented in hardware, software or a combination of hardware and software. If some or all of the training model is implemented in software, one or more instructions constituting the training model may be stored in the memory 63.

The processor 66 may infer a result value with respect to the new input data using the training model, and generate a response or control command based on the inferred result value.

Figure 6:
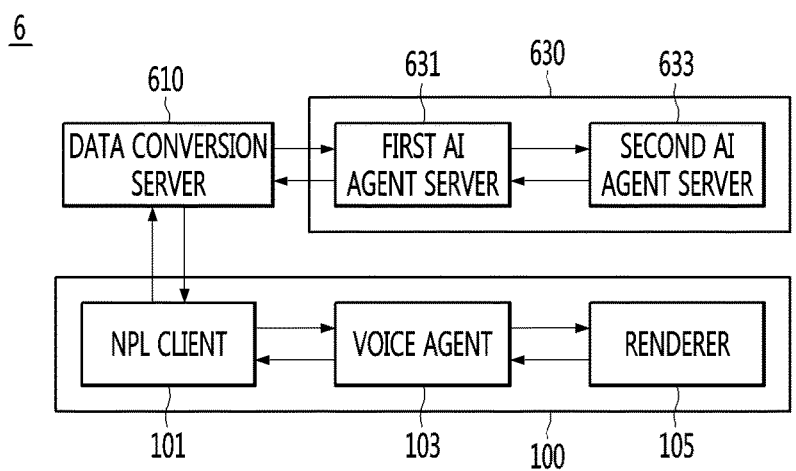
FIG. 6 is a view for describing the configuration of an artificial intelligence system according to another embodiment of the present disclosure.

FIG. 6 is a view for describing the configuration of an artificial intelligence system according to another embodiment of the present disclosure.

Referring to FIG. 6, the artificial intelligence system 6 may include a display device 100, a data conversion server 610, and an NLP server 630.

The display device 100 may transmit voice data corresponding to the voice command uttered by the user to the data conversion server 610.

The data conversion server 610 may receive voice data from the display device 100. The data conversion server 610 may convert the received voice data into text data.

The data conversion server 610 may convert the result of performing the intention in the form of text received from the NLP server 630 into voice data in the form of audio, and transmit the converted voice data to the display device 100.

The data conversion server 610 may transmit voice data indicating the AI agent change to the display device 100.

The natural language process (NLP) server 630 may include a first AI agent server 631 and a second AI agent server 633.

The NLP server 630 may receive text data from the data conversion server 610 and analyze the intention of the received text data using the natural language processing engine. The NLP server 630 may include one or more AI agent servers.

For example, the NLP server 630 may include a first AI agent server 631 and a second AI agent server 633.

The first AI agent server 631 may be a server that provides a natural language processing service through a manufacturer other than the manufacturer of the display device 100.

The second AI agent server 633 may be a server that provides natural language processing services through the manufacturer of the display device 100.

Each of the first AI agent server 631 and the second AI agent server 633 may include components of the AI server 10 illustrated in FIG. 5.

The data conversion server 610 may transmit text data to the first AI agent server 631.

The first AI agent server 631 may obtain the intention of the text data and determine whether to process an operation corresponding to the obtained intention.

If it is determined that the first AI agent server 631 can process an operation corresponding to the obtained intention, the first AI agent server 631 may obtain an intention analysis result corresponding to the intention.

If it is determined that the first AI agent server 631 cannot process an operation corresponding to the obtained intention, the first AI agent server 631 may transmit the intention of the text data to the second AI agent server 633.

The second AI agent server 633 may obtain an intention analysis result corresponding to the intention of the received text data, and transmit the obtained intention analysis result to the first AI agent server 631.

The first AI agent server 631 may transmit the intention analysis result to the data conversion server 610.

The data conversion server 610 may transmit the intention analysis result to the NLP client 101 of the display device 100.

The display device 100 may further include an NLP client 101, a voice agent 103, and a renderer 105.

The NLP client 101, the voice agent 103, and the renderer 105 may be included in the control unit 170 illustrated in FIG. 1.

As another example, the NLP client 101 may be included in the network interface unit 133 illustrated in FIG. 1.

The NLP client 101 may communicate with the data conversion server 610.

The voice agent 103 may receive a signal for entering the voice recognition mode from the remote control device 200 and activate operation of a microphone provided in the display device 100 according to the received signal.

The voice agent 103 may transmit the voice command received from the microphone included in the display device 100 or the voice command received from the remote control device 200 to the NLP client 101.

The voice agent 103 may receive intention analysis result information or search information received by the NLP client 101 from the NLP server 630.

The voice agent 103 may execute an application or perform a function corresponding to a button key of the remote control device 200 based on the intention analysis result information.

The voice agent 103 may be included in the configuration of the NLP client 103.

The renderer 105 may generate a UI through the GUI module to display the received search information on the display unit 180 and output the generated UI to the display unit 180.

Figure 7:
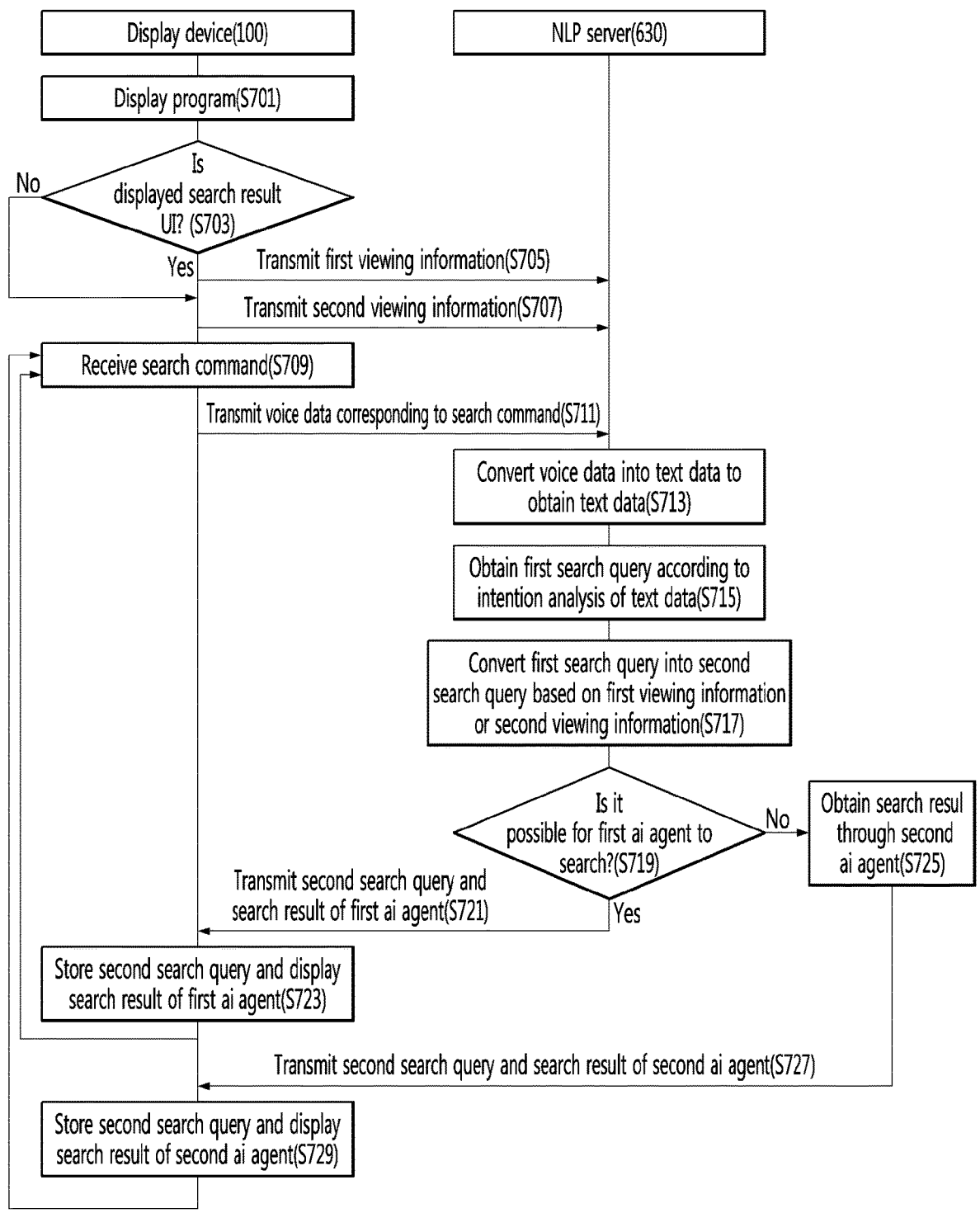
FIG. 7 is a ladder diagram for a method of operating an artificial intelligence system according to an embodiment of the present disclosure.

FIG. 7 is a ladder diagram for a method of operating an artificial intelligence system according to an embodiment of the present disclosure.

Hereinafter, a method of operating a system according to an embodiment of the present disclosure will be described with reference to FIGS. 5 and 6.

Also, hereinafter, the AI agent may be hardware or software that can recognize a voice command uttered by a user and provide information according to the intention of the recognized voice command.

The display device 100 or the NLP server 630 may be provided with a plurality of AI agents.

Meanwhile, some of the steps of FIG. 7 may be performed simultaneously, or the order of some steps may be reversed.

The control unit 170 of the display device 100 displays a program on the display unit 180 (S701).

In other words, the control unit 170 may be playing the program through the display unit 180.

The control unit 170 of the display device 100 determines whether the search result UI is displayed on the display unit 180 (S703).

The search result UI may be a user interface indicating a search result displayed according to a user's utterance or a search command received from the remote control device 200.

The search result may represent a search result of content such as a program.

The search result UI may include a plurality of content items according to the search result.

The control unit 170 may determine that the search result UI is displayed if the control unit receives the search term uttered by the user or the search command from the remote control device 200 and thus the search result is output.

If the search result UI is displayed on the display unit 180, the control unit 170 of the display device 100 transmits the first viewing information to the NLP server 630 through the network interface unit 133 (S705).

The first viewing information may include one or more of content information included in the search result UI, information of a program being viewed, and a previous search term uttered by the user.

The content information included in the search result UI may include one or more of a title list including a plurality of titles corresponding to each of the plurality of content items, a title of the focused item among the plurality of content items, and an arrangement relationship (or arrangement order) of the content items.

The title may be a name identifying a content item.

The information of the program being viewed is information for identifying the program and may include the name of the program.

The previous search term may be a command uttered by the user who caused the display of the search result UI. The previous search word may be a search word received by the display device 100 immediately before receiving a new search word.

If the search result UI is not displayed on the display unit 180, the control unit 170 of the display device 100 transmits the second viewing information to the NLP server 630 through the network interface unit 133 (S707).

The second viewing information may include one or more of information of a program being viewed and a previous search term that the user has uttered before.

The control unit 170 of the display device 100 receives a search command uttered by a user (S709).

According to an embodiment, the display device 100 may include a microphone and may receive a search command uttered by a user through the microphone.

In another embodiment, the wireless communication unit 173 of the display device 100 may receive a search command from the remote control device 200. In other words, the user may utter a search command through the remote control device 200, and the uttered search command may be transmitted to the display device 100 through the remote control device 200.

The control unit 170 of the display device 100 transmits voice data corresponding to the search command to the NLP server 630 through the network interface unit 133 (S711). The processor 66 of the NLP server 630 converts the received voice data into text data to obtain text data (S713).

The NLP server 630 may convert voice data into text data through the STT engine.

The processor 66 of the NLP server 630 obtains a first search query according to the intention analysis of the text data (S715).

The first search query may be a query reflecting a search intention of a search command uttered by a user.

The processor 66 of the NLP server 630 converts the first search query into a second search query based on the obtained first viewing information or second viewing information (S717).

If the first viewing information is received from the display device 100, the processor 66 may convert the first search query into a second search query based on the first viewing information.

In other words, if the display device 100 displays the search result UI, the processor 66 may convert the first search query into a second search query based on the first viewing information.

If the second viewing information is received from the display device 100, the processor 66 may convert the first search query into a second search query based on the second viewing information.

In other words, if the display device 100 does not display the search result UI, the processor 66 may convert the first search query into a second search query based on the second viewing information.

The second search query may be a query reflecting the name of the content in the search command uttered by the user.

In other words, the conversion of the first search query into the second search query may indicate generation of a second search query by including a name of a content item not included in the first search query.

Steps S715 and S717 will be described in more detail with reference to FIG. 8.

Figure 8:
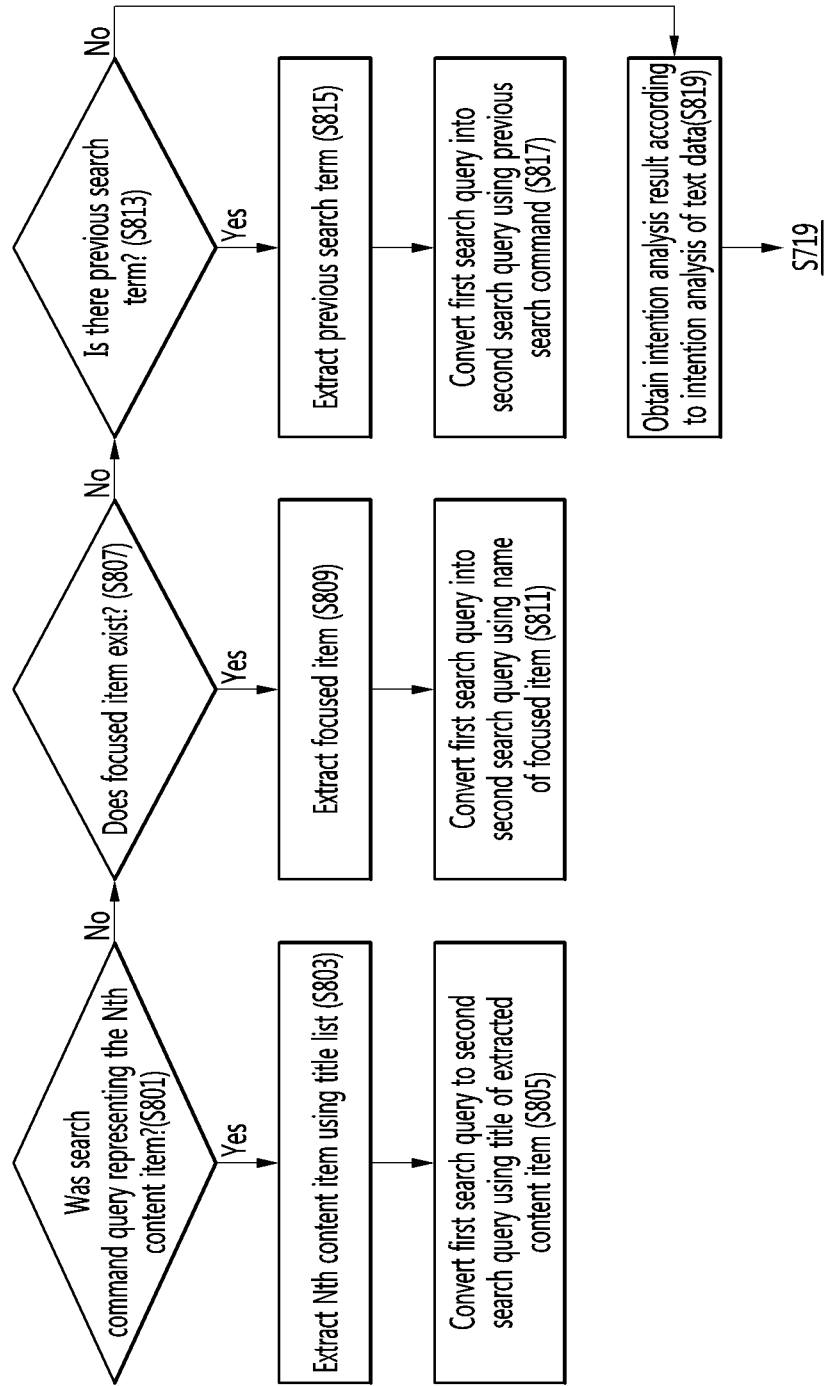
FIG. 8 is a diagram illustrating a method for describing a process of completing a search query by an NLP server based on first viewing information or second viewing information according to an embodiment of the present disclosure.

FIG. 8 is a diagram illustrating a method for describing a process of completing a search query by an NLP server based on first viewing information or second viewing information according to an embodiment of the present disclosure.

FIG. 8 is more detailed steps of steps S715 and S717.

Referring to FIG. 8, the processor 66 of the NLP server 630 determines whether the search command is a query indicating an Nth content item among a plurality of content items included in the search result UI according to the intention analysis of the search command. (S801).

The processor 66 may use the natural language processing engine to determine whether the intention of the search command is to select a content item at a specific location.

If the intention of the search command is a query for selecting the Nth content item, the processor 66 of the NLP server 630 extracts the Nth content item based on the title list included in the first viewing information (S803).

The title list may be a list including titles of a plurality of content items included in the search result UI displayed by the display device 100.

The processor 66 may extract a title of the Nth content item included in the title list according to the intention of selecting the Nth content item.

The processor 66 of the NLP server 630 converts the first search query into a second search query by using the extracted Nth item title (S805).

The processor 66 may include the title of the Nth content item in the first search query to generate a second search query.

Meanwhile, if the intention of the search command is not a query for selecting the Nth content item, the processor 66 of the NLP server 630 determines whether a focused item exists among the plurality of content items included in the search result UI. (S807).

In one embodiment, the focused content item may be selected by the pointer 205 controlled by the remote control device 200 or may be a selected item through a highlight box.

If there is a focused item, the processor 66 of the NLP server 630 extracts the focused content item (S809).

The processor 66 may extract the title of the focused content item from the first viewing information.

The processor 66 of the NLP server 630 converts the first search query into a second search query by using the extracted title of the content item (S811).

The processor 66 may include the title of the extracted content item in the first search query to generate a second search query.

Meanwhile, if the focused content item does not exist on the search result UI, the processor 66 of the NLP server 630 determines whether a previous search term exists (S813).

If the intention of the search command is neither the selection of the Nth content item nor the focused content item, the processor 66 may determine whether a previous search term exists based on the second viewing information.

If the previous search term exists, the processor 66 of the NLP server 630 extracts the previous search term (S815) and converts the first search query to the second search query using the extracted previous search term (S817).

The processor 66 may generate a second search query by including the previous search term in the first search query.

If there is no previous search term (S813), the processor 66 of the NLP server 630 obtains an intention analysis result according to the intention analysis of the text data (S819).

The processor 66 may obtain the intention performance result (or search result) according to the intention analysis result from the first AI agent or the second AI agent, and transmit the obtained intention performance result to the display device 100.

Again, FIG. 7 is described.

The processor 66 of the NLP server 630 determines whether the first AI agent can perform a search corresponding to the converted second search query (S719).

The processor 66 may transmit a second search query to the first AI agent server 631 to inquire whether a search according to the second search query is possible.

If a search according to the second search query is possible, the first AI agent server 631 may obtain a search result and transfer the obtained search result to the processor 66.

As another example, the processor 66 may determine an agent capable of performing a search according to the second search query among the first AI agent and the second AI agent according to the type of the second search query.

For example, if the second search query is related to the movie, the target of the search may be determined as the first AI agent, and if the second search query is related to the weather, the target of the search may be determined as the second AI agent.

If the first AI agent determines that a search corresponding to the second search query can be performed, the processor 66 of the NLP server 630 obtains a search result corresponding to the second search query from the first AI agent server 631 and transmit the second search query and the search result of the first AI agent to the display device 100 through the communication unit 61 (S721).

The control unit 170 of the display device 100 stores the second search query received from the NLP server 630 in the storage unit 140 and displays the search result of the first AI agent on the display unit 180 (S723).

The control unit 170 may store the second search query as the previous search term in the storage unit 140.

The control unit 170 may update the second search query with the most recently searched search term.

The search result of the first AI agent may be information provided in response to a search command uttered by a user.

If the first AI agent determines that a search corresponding to the second search query cannot be performed, the processor 66 of the NLP server 630 obtains a search result corresponding to the second search query from the second AI agent server 633 (S725).

The processor 66 of the NLP server 630 transmits the second search query and the search result of the second AI agent to the display device 100 through the communication unit 61 (S727).

The control unit 170 of the display device 100 stores the second search query in the storage unit 140, and displays the search result of the second AI agent on the display unit 180 (S729).

The control unit 170 may update the second search query with the most recently searched search term.

Hereinafter, FIG. 7 is described in more detail.

Figure 9:
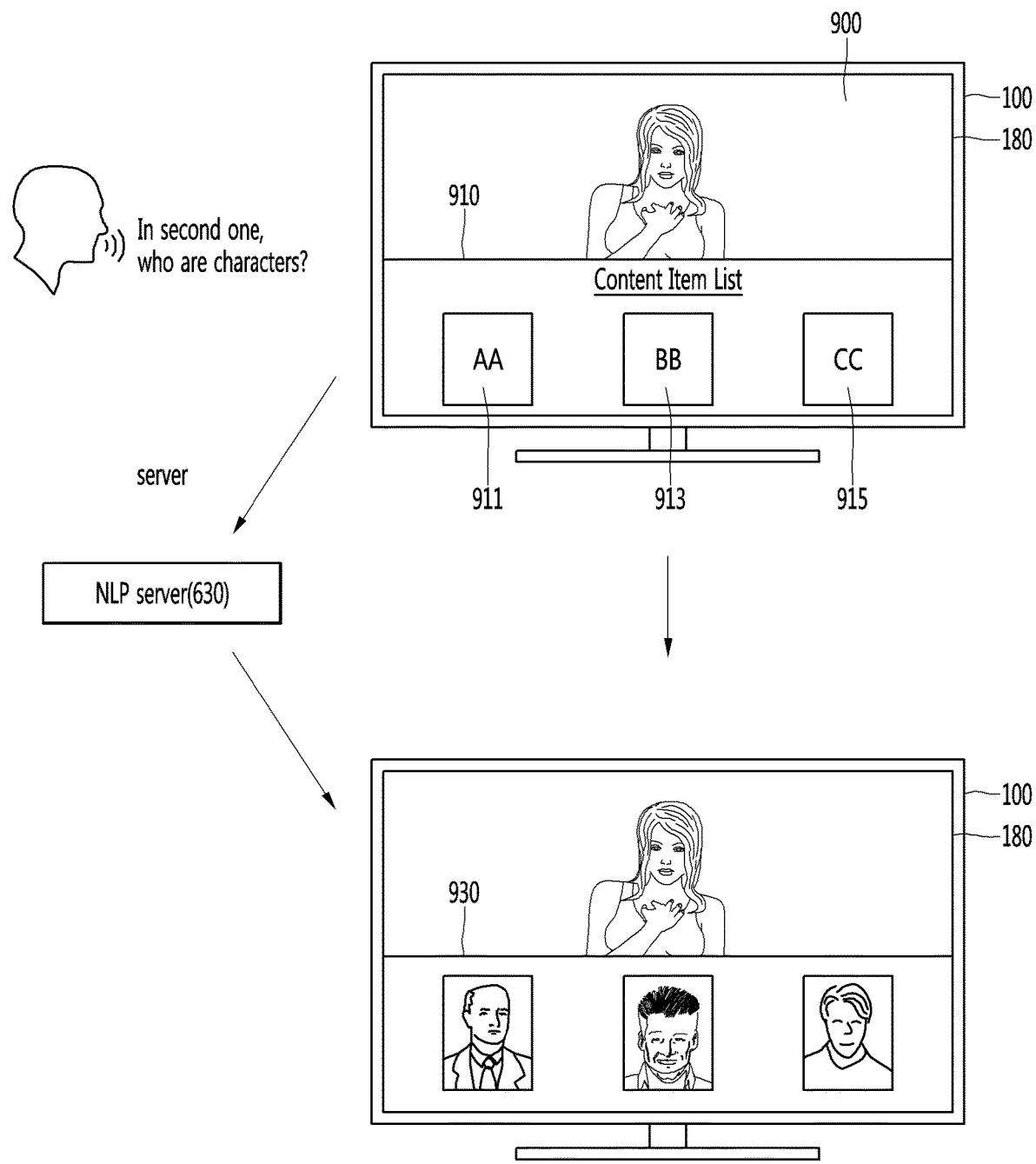
FIGS. 9 to 11 are diagrams for describing a process of performing an operation corresponding to a search command uttered by a user based on a display of a search result UI or a previous search term according to an embodiment of the present disclosure.
Figure 10:
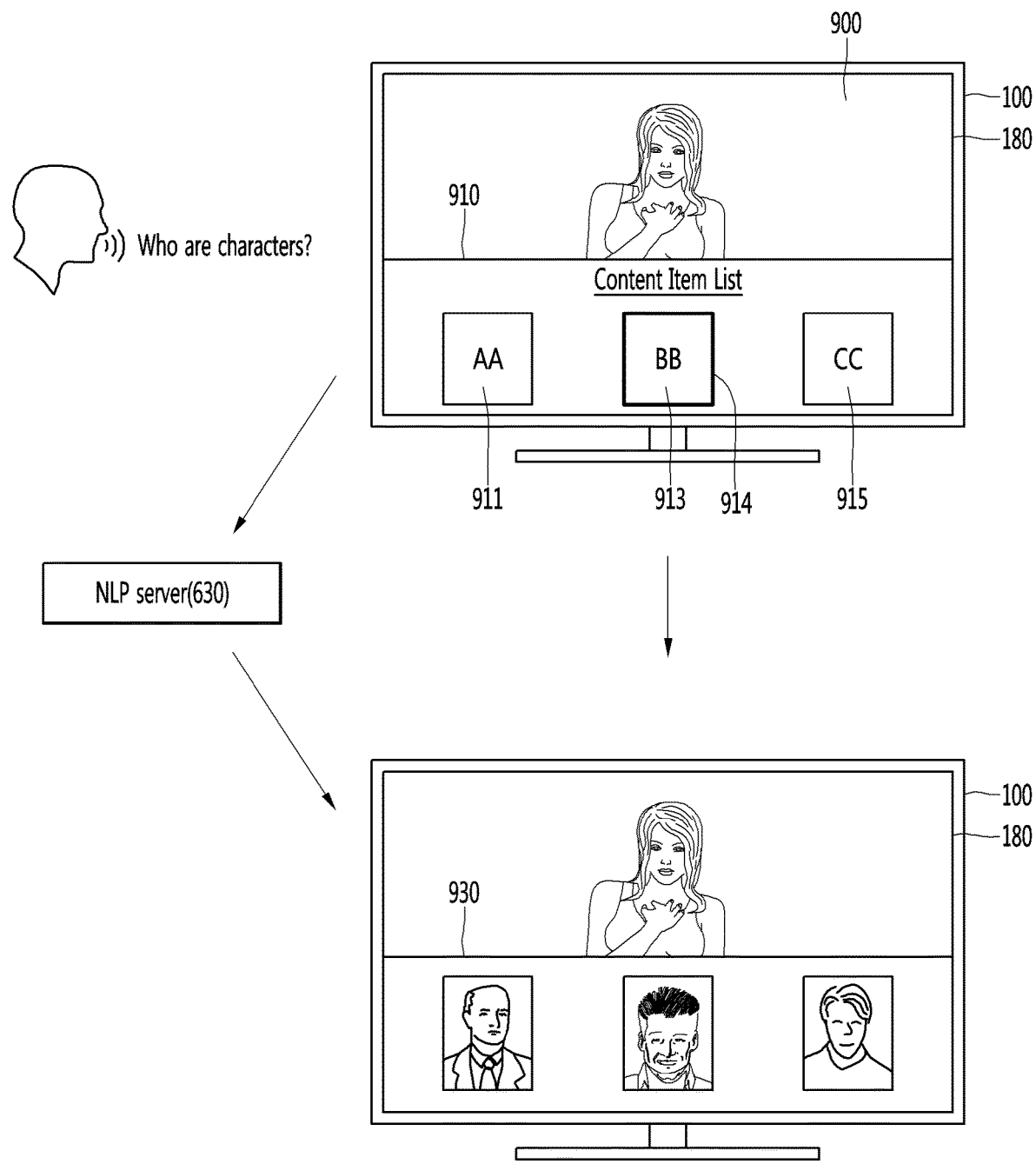
Figure 11:
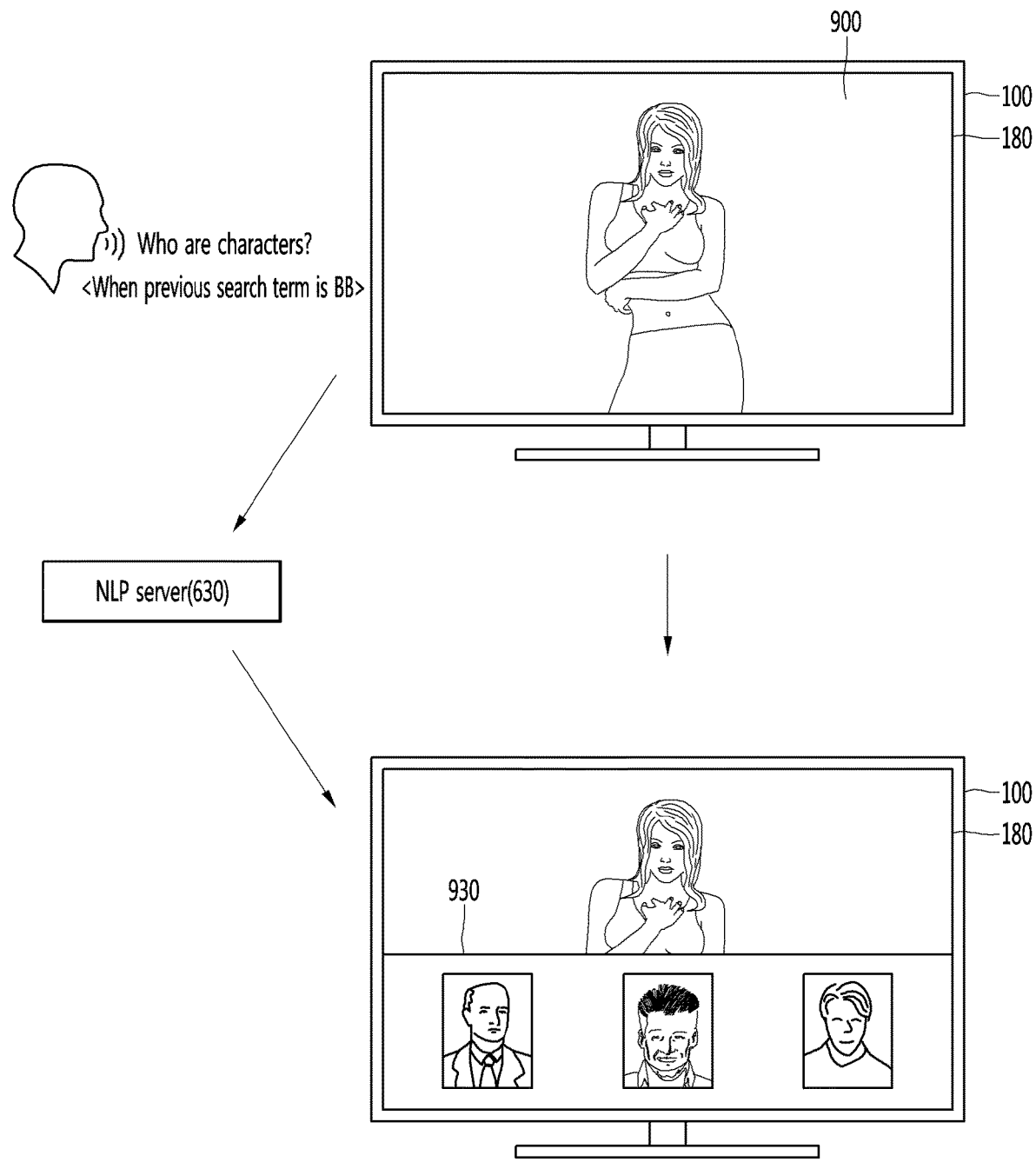

FIGS. 9 to 11 are diagrams for describing a process of performing an operation corresponding to a search command uttered by a user based on a display of a search result UI or a previous search term according to an embodiment of the present disclosure.

First, FIGS. 9 and 10 are scenarios illustrating a case where a user utters a search command while a search result UI is displayed on the display unit 180.

Referring to FIGS. 9 and 10, the display unit 180 of the display device 100 displays a program 900 and a search result UI 910.

The search result UI 910 may be a content item list including content items searched by a user's utterance.

The search result UI 910 may include a plurality of content items 911 to 915 for identifying each of the plurality of contents.

According to step S705 of FIG. 7, the display device 100 can transmit titles of content items included in the search result UI, an arrangement relationship (or arrangement order) of the content items, information of the program 900 being viewed, and, the first viewing information including one or more of the previous search word previously uttered by the user to the NLP server 630.

The NLP server 630 may receive and store the first viewing information received from the display device 100.

In FIG. 9, while the display device 100 displays the search result UI 910, the display device 100 may receive a search command "in the second one, who are characters?" and transmit voice data corresponding to the received search command to the NLP server 630.

The NLP server 630 may obtain the first search query by converting the received voice data into text data.

The first search query may be a query indicating a search intention of the character of the specific content item.

The NLP server 630 may obtain a title corresponding to the second arranged content item by using the arrangement relationship of the plurality of content items included in the search result UI 910 and the titles of the plurality of content items.

The NLP server 630 may obtain a second search query that adds the title obtained to the first search query.

In FIG. 9, the second search query may be <who are characters of BB?> including the BB which is the title of the second located content item 913.

In other words, the second search query may be a query for searching for information on the character of the content item having the title of BB.

The NLP server 630 may obtain information on the character of the content item called BB from the first AI agent server 631 or the second AI agent server 633 according to the second search query, and transmit the obtained information on the character to the display device 100.

The display device 100 may display the information 930 on the character received from the NLP server 630 on the display unit 180.

As such, if the search result is displayed on the display device 100, the search result may be transmitted to the NLP server 630 to analyze the user's utterance intention.

Accordingly, the user can enjoy an improved experience of obtaining the desired information without uttering the title of the content item.

Next, FIG. 10 will be described.

In particular, FIG. 10 assumes that the second content item 913 of the first to third content items 911 to 915 included in the search result UI 910 is focused through the highlight box 914.

In FIG. 10, while the display device 100 displays the search result UI 910, the display device 100 may receive a search command "Who are characters?", and transmit the voice data corresponding to the received search command to the NLP server 630.

The NLP server 630 may obtain the first search query by converting the received voice data into text data.

The first search query may be a query indicating a search intention of the character of the specific content item.

The NLP server 630 may obtain a title corresponding to the focused content item by using whether the plurality of content items included in the search result UI 910 are in focus and the titles of the plurality of content items.

The NLP server 630 may obtain a second search query to which the obtained title is added to the first search query.

In FIG. 10, the second search query may be <who are characters of BB?> that includes the BB that is the title of the focused second content item 913.

In other words, the second search query may be a query for searching for information on the character of the content item having the title of BB.

The NLP server 630 may obtain information on the character of the content item called BB from the first AI agent server 631 or the second AI agent server 633 according to the second search query, and transmit the obtained information on the character to the display device 100.

The display device 100 may display the information 930 on the character received from the NLP server 630 on the display unit 180.

As such, if there is a focused item among the search results on the display device 100, the search result of the focused item may be transmitted to the NLP server 630 to analyze the utterance intention of the user.

Accordingly, the user can enjoy an improved experience of obtaining desired information with the only simple utterance, without having to utter the title of the content item.

Next, FIG. 11 will be described.

In particular, unlike embodiments of FIGS. 9 and 10, FIG. 11 is an example in which the user utters a search command "Who are characters?" while the search result UI is not displayed on the display unit 180.

In addition, in FIG. 11, it is assumed that the previous search term previously uttered by the user is <BB> which is the title of the second content item 913.

The display device 100 may transmit, to the NLP server 630, second viewing information including one or more of the information of the program 900 being viewed and the previous search term.

In FIG. 11, the display device 100 may receive a search command "Who are characters?" and transmit voice data corresponding to the received search command to the NLP server 630.

The NLP server 630 may obtain the first search query by converting the received voice data into text data.

The first search query may be a query indicating a search intention of the character. Since the NLP server 630 did not receive the information about the search result UI 910 from the display device 100, the NLP server 630 may generate a second search query using the previous search term <BB>.

In other words, the NLP server 630 may obtain a second search query appended with <BB>, which is a previous search term obtained in the first search query.

In FIG. 11, the second search query may be <who are characters of BB?> including the BB which is the title of the second content item 913.

In other words, the second search query may be a query for searching for information on the character of the content item having the title of BB.

The NLP server 630 may obtain information on the character of the content item called BB from the first AI agent server 631 or the second AI agent server 633 according to the second search query, and transmit the obtained information on the character to the display device 100.

The display device 100 may display the information 930 on the character received from the NLP server 630 on the display unit 180.

As such, according to an embodiment of the present disclosure, a user's utterance intention may be analyzed by using a previous search term.

Accordingly, the user can enjoy an improved experience of obtaining desired information with only simple utterance, without having to utter the title of the content item.

Figure 12A:
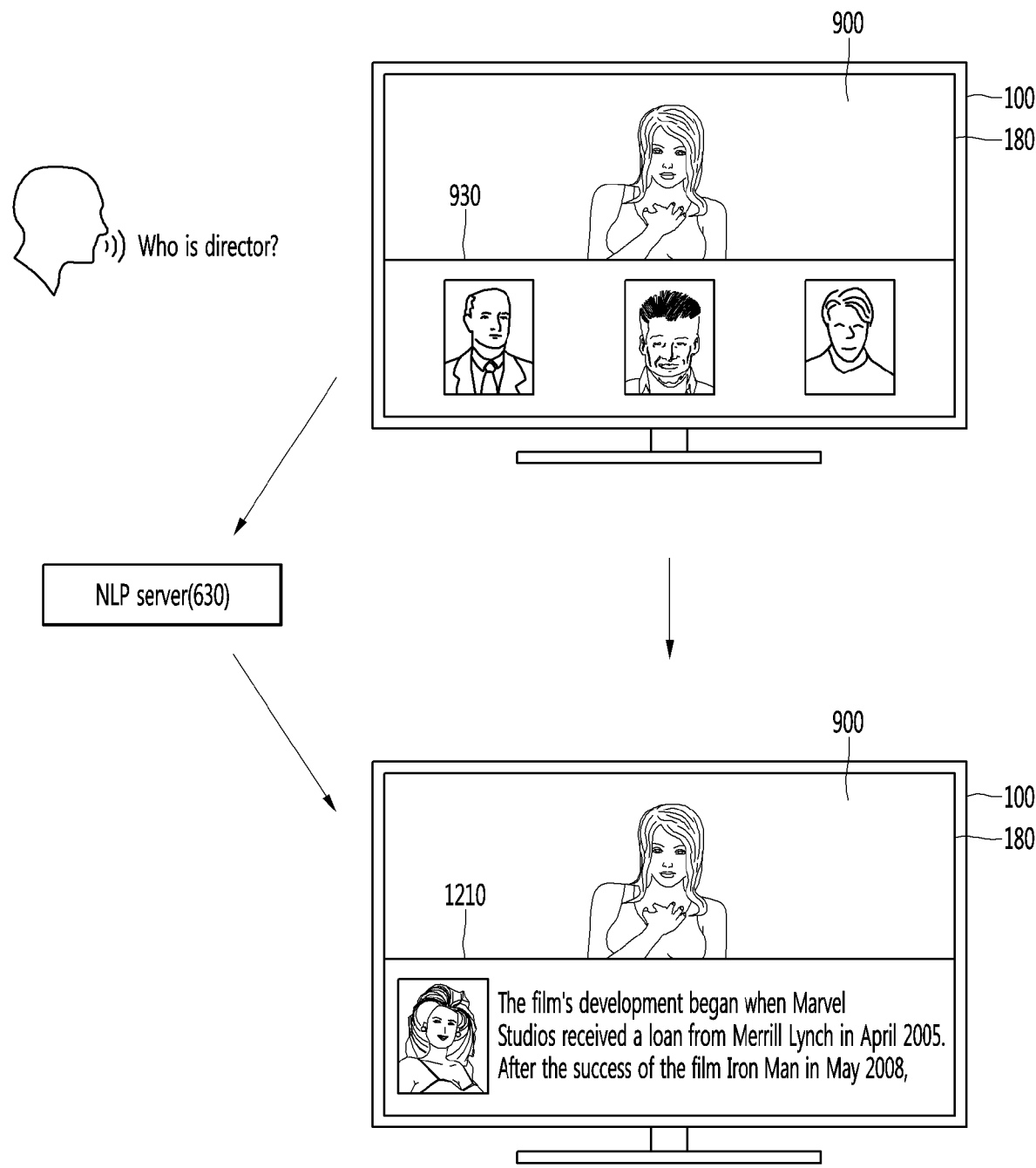
FIGS. 12A and 12B are views for illustrating an example of providing a search result through continuous utterance according to an embodiment of the present disclosure.
Figure 12B:
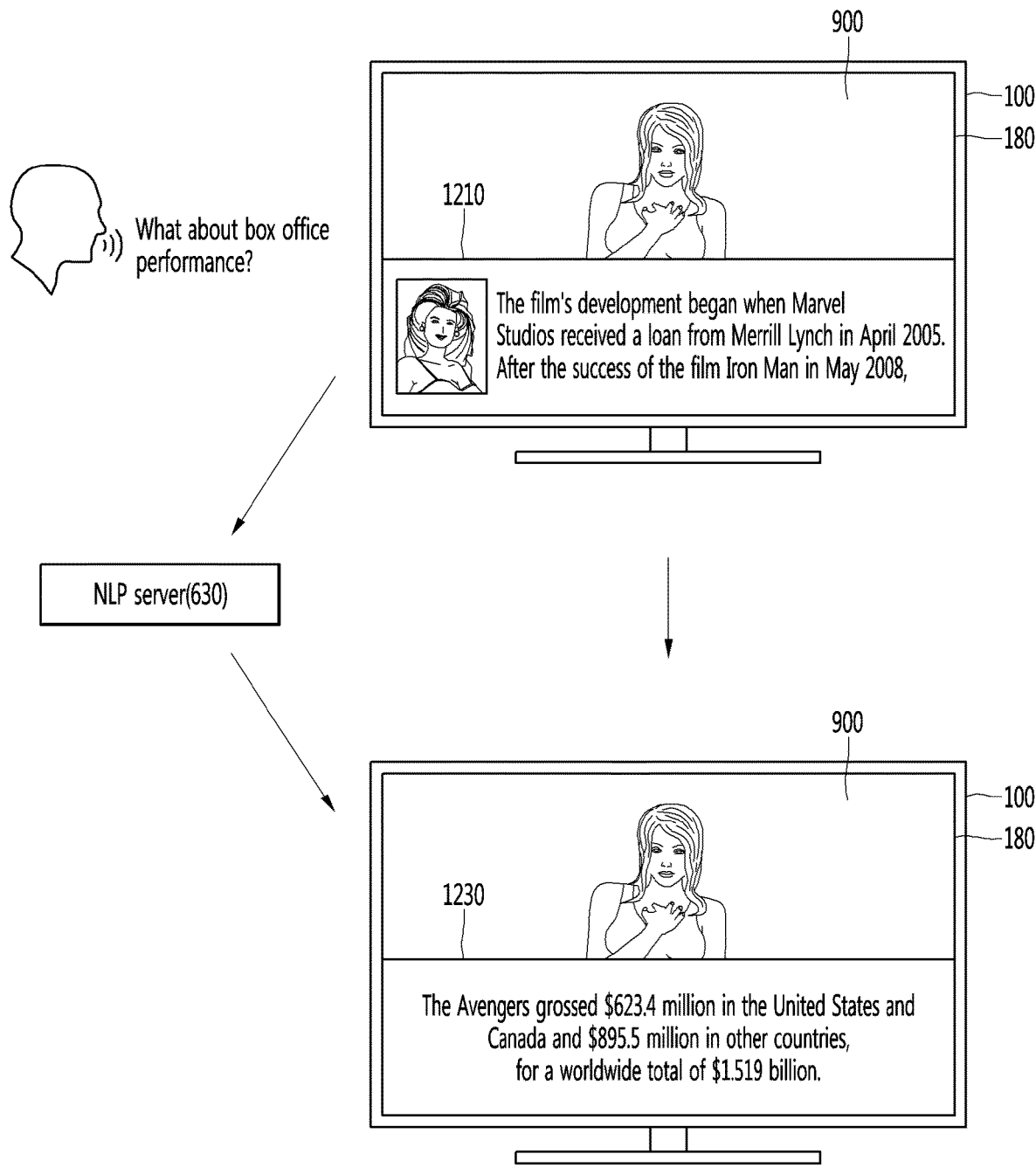

FIGS. 12A and 12B illustrate an example of providing a search result through continuous utterance according to an embodiment of the present disclosure.

FIG. 12A may be a scenario performed after the embodiment of any one of FIGS. 9 to 11.

Referring to FIG. 12A, the display device 100 displays information 930 representing a search result of the character of the second content item 913.

The display device 100 may receive an additional search command of <who is a director?>. The display device 100 may transmit voice data corresponding to the additional search command to the NLP server 630.

The NLP server 630 may recognize that the second content item 913 is currently selected and search for information on the director who produced the second content item 913 based on the intention of the received voice data.

In other words, if an additional search command <who is a director?> is received in a state where the second content item 913 is selected among the first to the third content items 911 to 915, the additional search command may be recognized as a search query requesting the search for information related to the second content item 913.

The NLP server 630 may obtain search information related to the second content item 913 with respect to the received additional search command until the intention of canceling the selection of the second content item 913 is determined.

The NLP server 630 may obtain the search information for the director who produced the second content item 913 from the first AI agent server 631 or the second AI agent server 633, and transmit the search information for the obtained director to the display device 100.

The display device 100 may display the received search information 1210 on the director on the display unit 180.

In this state, the display device 100 may receive an additional search command of <what about box office performance?>. The display device 100 may transmit voice data corresponding to the additional search command to the NLP server 630.

The NLP server 630 can recognize that the second content item 913 is currently selected, and the box office performance of the second content item 913 can be searched based on the title of the second content item 913 based on the intention of the received voice data.

In other words, if the NLP server 630 receives the additional search command <what about box office performance?> While the second content item 913 is selected among the first to third content items 911 to 915, the NLP server 630 may recognize the additional search request as a search query requesting the search for information related to the second content item 913.

The NLP server 630 may obtain search information related to the second content item 913 with respect to the received additional search command until the intention of canceling the selection of the second content item 913 is determined.

The NLP server 630 may obtain search information indicating the box office performance of the second content item 913 from the first AI agent server 631 or the second AI agent server 633, and transmit the search information about the obtained box office performance may be transmitted to the display device 100.

The display device 100 may display the search information 1230 on the received box office performance on the display unit 180.

As described above, according to the present embodiment, in a multi-AI agent structure, a user may continuously search for information to be checked through continuous utterance.

Accordingly, the user may feel an improved experience of confirming various search results.

Meanwhile, the intention of canceling the selection of the second content item 913 may be identified if re-requesting the display of the search result UI 910.

As another example, the intention of canceling the selection of the second content item 913 may be identified if a selection of a content item other than the second content item 913 is requested.

This will be described later.

FIG. 12C is a diagram for describing a process of canceling the selection of a content item.

Referring to FIG. 12C, the display device 100 displays information 1230 indicating the box office performance of the second content item 913.

In this state, the user can utter a <first item>.

The display device 100 may receive a voice command "the first item" and cancel the selection of the second content item 913 according to the received voice command.

In detail, the display device 100 may transmit voice data of a voice command of <first item> to the NLP server 630.

The NLP server 630 may convert the received voice data into text data, and recognize that the intention of the converted text data is to select the first content item 911.

In other words, the NLP server 630 may recognize the intention of the text data as the intention of canceling the selection of the second content item 913.

The NLP server 630 may cancel the selection of the second content item 913 and transmit a request to display the search result UI 910 to the display device 100.

In response to the request received from the NLP server 630, the display device 100 may convert the information 1230 indicating the box office performance into the search result UI 910.

In other words, the display device 100 may display the search result UI 910 on the display unit 180.

At the same time, the display device 100 may focus the first content item 911 located first of the search result UI 910. In other words, the selection of the second content item 913 is canceled by the user's utterance of <first item> and the first content item 911 may be automatically selected.

Thereafter, the user may utter a search command to receive a search result with respect to the first content item 911.

As described above, according to an embodiment of the present disclosure, a user may select or cancel a content item and search for information on the desired content item by simple utterance. As another example, the NLP server 630 may receive a request for canceling the selection of the second content item 913 from the display device 100. The display device 100 may receive a selection canceling request from the remote control device 200 and transmit the received selection canceling request to the NLP server 630.

Next, a method for operating an artificial intelligence system according to another embodiment of the present disclosure will be described.

FIG. 13 is a ladder diagram for describing a method of operating an artificial intelligence system, according to another embodiment.

Referring to FIG. 13, the control unit 170 of the display device 100 displays a program image on the display unit 180 (S1301).

The control unit 170 of the display device 100 obtains information of an object included in a program image (S1303).

In an embodiment, the control unit 170 may capture a program image and transmit the captured image to the image recognition server.

The image recognition server may recognize one or more objects included in the image from the captured image. The image recognition server may recognize an object from the image by using an image recognition model supervised by a deep learning algorithm or a machine learning algorithm.

In other words, the image recognition server may obtain a name for identifying the object from the image.

The image recognition server may transmit a name for identifying the object to the display device 100.

In another embodiment, a pointer 205 controlled by the remote control device 200 may be displayed on the display unit 180.

The captured image of the program image may include a pointer 205.

The image recognition server may identify an object corresponding to the position of the pointer 205 using the image recognition model.

The image recognition server may identify the pointer 205 from the captured image and identify an object corresponding to the position of the pointer 205.

The image recognition server may transmit the name of the identified object to the display device 100.

The control unit 170 of the display device 100 receives a voice command (S1305), and transmits voice data and object information corresponding to the received voice command to the NLP server 630 (S1307).

The processor 66 of the NLP server 630 converts the voice data received from the display device 100 into text data to obtain text data (S1309).

The NLP server 630 may convert voice data into text data using the STT engine.

The processor 66 of the NLP server 630 obtains a first query based on the intention analysis of the text data (S1311).

The first query may reflect a result of intention analysis of a voice command uttered by a user.

The processor 66 of the NLP server 630 converts the first query to the second query based on the information of the object (S1313).

The processor 66 may combine the name of the object with the first query to generate a second query.

The processor 66 of the NLP server 630 obtains an intention performance result corresponding to the second query from any one of the plurality of AI agents (S1315).

The processor 66 may transmit a second query to the first AI agent 631 or the second AI agent 633 and may obtain the intention performance result corresponding to the second query from the first AI agent 631 or the second AI agent 633.

If the second query reflects the intention of searching for detailed information on the object, the intention performance result may be a search result of the detailed information of the object.

The processor 66 of the NLP server 630 transmits the intention performance result to the display device 100 through the communication unit 61 (S1317).

The control unit 170 of the display device 100 displays the intention performance result received from the NLP server 630 on the display unit 180 (S1319).

Meanwhile, some of the steps illustrated in FIG. 13 may be performed at the same time, and the order of the steps may be reversed.

Figure 15:
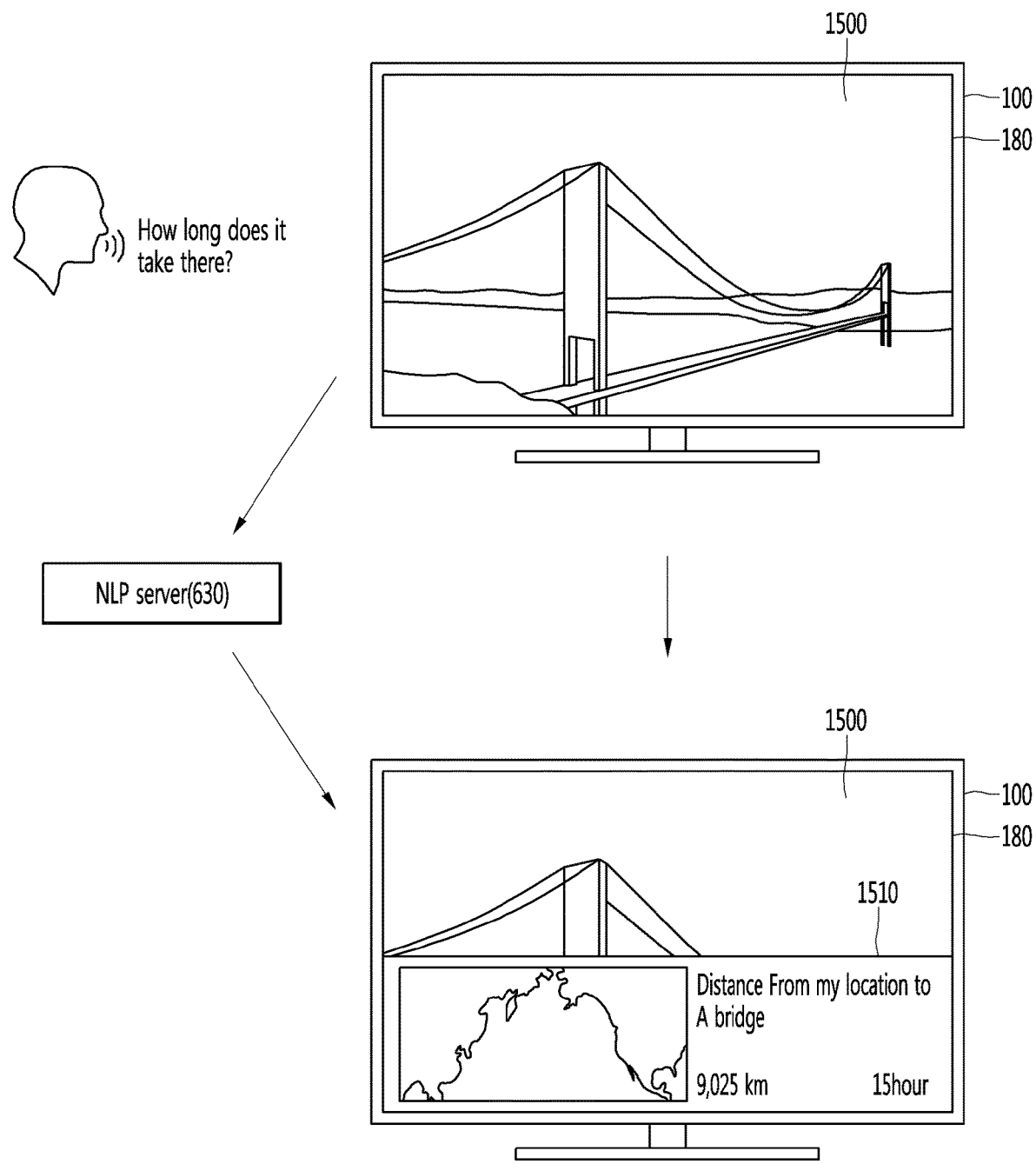

FIGS. 14 and 15 are diagrams for describing an embodiment of grasping a user's utterance intention using an object recognition technology.

Referring to FIG. 14, the display device 100 displays a program image 1400 on the display unit 180.

The user may place the pointer 205 on the sneaker 1410 included in the program image 1400 through the manipulation of the remote control device 200.

The display device 100 may capture the program image 1400 and transmit the captured image to the image recognition server.

The display device 100 may obtain the coordinates of the pointer 205 and transmit the captured image and the coordinates of the pointer 205 to the image recognition server 1610 together.

The display device 100 may capture the program image 1400 at the time if the voice command of the user is received. In other words, the voice command uttered by the user may be a trigger for capturing the program image 1400.

The image recognition server may be included in the NLP server 630.

The image recognition server may analyze the captured image using the image recognition model and identify the sneaker 1410 corresponding to the position of the pointer 205 included in the image.

The image recognition server may transmit the information of the sneaker including one or more of the name and the brand of the sneaker to the display device 100.

The display device 100 may receive a voice command "Please, add that to the shopping list" and transmit voice data of the received voice command and information of the sneaker to the NLP server 630.

The NLP server 630 may convert the voice data into text data and obtain a first query reflecting the intention of adding the object to the shopping list according to the intention analysis operation.

The NLP server 630 may combine the information of the sneakers with the first query to generate a second query. The second query may reflect the intention to add A brand sneakers to the shopping list.

The NLP server 630 may transmit a second query to the first AI agent server 631 or the second AI agent server 633, and receive detailed information on the A brand sneakers.

The NLP server 630 may add the received detailed information of the A brand to the shopping list and transmit the shopping list reflecting the detailed information of the A brand to the display device 100.

The display device 100 may display the shopping list 1430 including the detailed information 1431 of the A brand on the display unit 180.

As described above, according to the embodiment of the present disclosure, the user may check the desired action or the detailed information of the object with respect to the object included in the program image by simple utterance while viewing the program.

Next, FIG. 15 is described.

Referring to FIG. 15, the display device 100 displays a program image 1500 on the display unit 180.

The display device 100 may capture the program image 1500 and transmit the captured image to the image recognition server.

The display device 100 may capture the program image 1500 at the time if the voice command of the user is received. In other words, the voice command uttered by the user may be a trigger for capturing the program image 1500.

The image recognition server may be included in the NLP server 630.

The image recognition server may analyze the captured image by using the image recognition model and recognize a landmark included in the image.

The image recognition server may transmit the landmark information including the name of the landmark to the display device 100.

The display device 100 may receive a voice command "how long does it take there?" and transmit voice data of the received voice command and landmark information to the NLP server 630.

The NLP server 630 may convert the voice data into text data and obtain a first query that reflects the intention of requesting the time required to go to the landmark from the current location according to the intention analysis operation.

The NLP server 630 may combine the name of the landmark with the first query to generate a second query. The second query may reflect the intention to want the time which takes from the current location to the B bridge.

The NLP server 630 may transmit the second query to the first AI agent server 631 or the second AI agent server 633 and receive detailed information including the time which takes to reach the A bridge.

The NLP server 630 may transmit the received detailed information to the display device 100.

The display device 100 may display the detailed information 1510 on the display unit 180 including the distance to the A bridge and the time which takes to go to the A bridge through the plane.

As described above, according to the embodiment of the present disclosure, the user may check the desired action with respect to the object or the detailed information of the object included in the program image by simple utterance while viewing the program.

Figure 16:
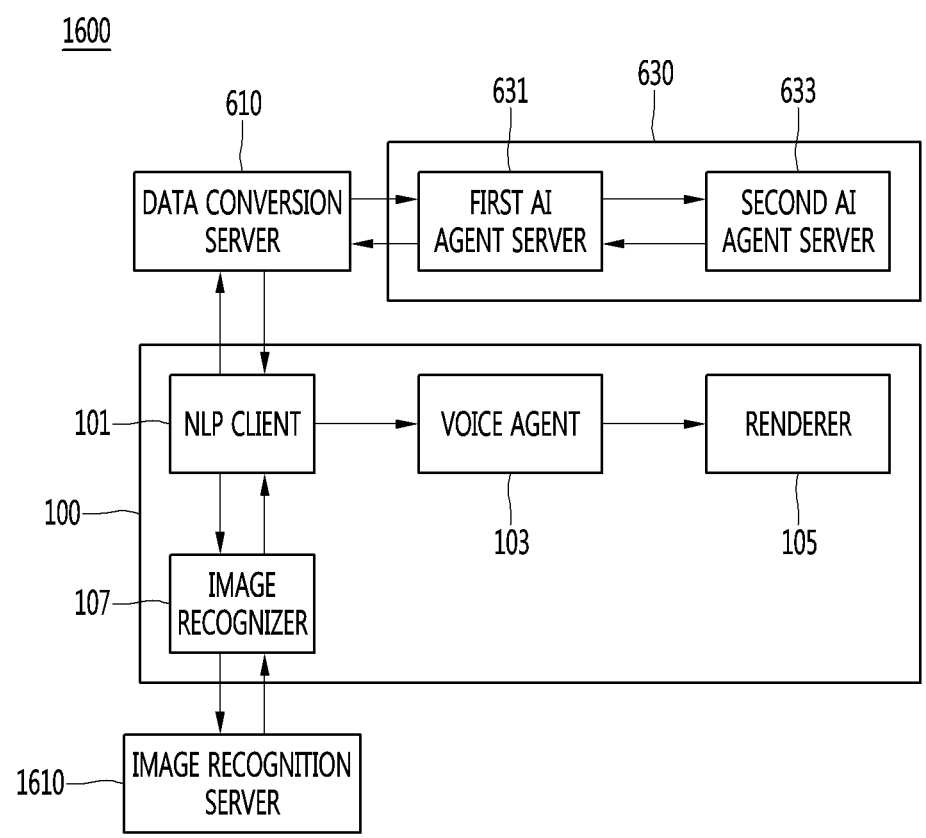
FIG. 16 is a view for describing another form of artificial intelligence system according to the embodiment of FIGS. 13 to 15.

FIG. 16 is a view for describing another form of artificial intelligence system according to the embodiment of FIGS. 13 to 15.

Compared to the artificial intelligence system 6 of FIG. 6, the artificial intelligence system 1600 of FIG. 16 has an additional configuration of an image recognition server 1610 and an image recognizer 107.

The image recognizer 107 may be included in the control unit 170 of the display device 100.

The image recognizer 107 may capture a program image displayed on the display unit 180 and transmit the captured image to the image recognition server 1610.

The image recognizer 107 may capture a program image in real time or periodically. As another example, the image recognizer 107 may capture a program image if a voice command of a user is received.

At the time of capturing, the image recognizer 107 may obtain the coordinates of the pointer 205 and transmit the captured image and the coordinates of the pointer 205 to the image recognition server 1610.

The image recognizer 107 may be configured to exist separately from the control unit 170.

The image recognition server 1610 may recognize an object included in the captured image received from the image recognizer 107 using the image recognition model.

If the image recognition server 1610 receives the captured image and the coordinates of the pointer 205 together, the image recognition server 1610 may recognize an object corresponding to the coordinates of the pointer 205.

The image recognition server 1610 may transmit identification information of the object including the name of the recognized object to the image recognizer 107.

The image recognizer 107 may transmit identification information of the object to the NLP client 101.

The NLP client 101 may transmit voice data corresponding to the object identification information and the voice command uttered by the user to the data conversion server 610.

The data conversion server 610 may convert the voice data into text data and transmit the converted text data and identification information of the object to the NLP server 630.

The NLP server 630 may obtain a first query indicating the intention analysis result of text data, and generate a second query based on the identification information of the object and the first query.

The NLP server 630 may transmit the second query to the first AI agent server 631 or the second AI agent server 633, and obtain the intention performance result of the second query from either of the first AI agent server 631 or the second AI agent server 633.

The NLP server 630 may transmit the intention performance result to the data conversion server 610, and the data conversion server 610 may transmit the intention performance result to the NLP client 101 in the form of text data.

According to an embodiment of the present disclosure, the above-described method may be embodied as a processor readable code on a medium in which a program is recorded.

Examples of processor-readable media include ROM, RAM, CD-ROM, magnetic tape, floppy disk, optical data storage device, and the like, and may be implemented in the form of a carrier wave (for example, transmission over the Internet).

The display device described above may not be limitedly applied to the configuration and method of the above-described embodiments, but the embodiments may be configured by selectively combining all or some of the embodiments so that various modifications may be made.

What is claimed is:

1. An artificial intelligence device comprising:
    a communication interface configured to communicate with a display device; and
    a processor configured to:

receive voice data corresponding to viewing information and a search command from the display device through the communication interface, convert the received voice data into text data, obtain a first query indicating the intention of the converted text data, convert the first query into a second query based on the viewing information, obtain a search result corresponding to the converted second query, transmit the obtained search result to the display device, and determine an artificial intelligence (AI) agent to perform a search corresponding to the second query among a plurality of AI agents, each of which represents a respective subject providing a voice recognition service.

2. The artificial intelligence device of claim 1,
wherein the viewing information includes at least one of content information included in a search result user interface (UI) displayed on the display device, information on a program being viewed on the display device or previous search word previously uttered by a user.

3. The artificial intelligence device of claim 2,
wherein the content information includes at least one of a title list including a plurality of titles corresponding to each of a plurality of content items included in the search result UI, a title of a focused item among a plurality of content items or a placement relationship of the content items.

4. The artificial intelligence device of claim 3,
wherein the processor is configured to:
extract an Nth content item based on the content information if the search result UI is displayed on the display device and the first query is a query indicating the Nth content item among a plurality of content items, and
convert the first query to the second query using the title of the Nth content item.

5. The artificial intelligence device of claim 3,
wherein the processor is configured to:
extract a focused content item if the search result UI is displayed on the display device and a focused item exists among the plurality of content items, and
convert the first query to the second query using the title of the extracted content item.

6. The artificial intelligence device of claim 2,
wherein the processor is configured to:
convert the first query to the second query using the previous search word if the search result UI is not displayed on the display device.

7. The artificial intelligence device of claim 4,
wherein the processor is configured to:
receive voice data corresponding to an additional search command from the display device,
convert the received voice data corresponding to the additional search command into second text data, and
obtain additional search results that reflect the intention of the converted second text data for the Nth content item.

8. The artificial intelligence device of claim 7,
wherein the processor is configured to:
cancel the selection of the Nth content item in a case of receiving a command that reflects intention of canceling the selection of the Nth content item from the display device.

9. The artificial intelligence device of claim 1,
wherein the processor is configured to:
obtain the search result corresponding to the second query from the determined AI agent.

10. The artificial intelligence device of claim 9,
wherein each of a first AI agent and a second AI agent of the plurality of AI agents is an agent representing a subject providing a voice recognition service.

11. An artificial intelligence device comprising:
a communication interface configured to communicate with a display device; and
a processor configured to:
receive voice data corresponding to object information and a voice command from the display device through the communication interface, wherein the object information is a name for identifying an object included in a program image displayed on the display device,
convert the received voice data into text data,
obtain a first query indicating the intention of the converted text data,
combine the name identifying the object with the first query to generate a second query,
transmit the second query to any one of a plurality of artificial intelligence (AI) agents,
obtain an intention performance result corresponding to the generated second query, and
transmit the obtained intention performance result to the display device.

12. The artificial intelligence device of claim 11,
wherein the intention performance result includes detailed search information of the object.

* * * * *